(12) United States Patent
Kim

(10) Patent No.: US 11,230,361 B2
(45) Date of Patent: Jan. 25, 2022

(54) FLIGHT VEHICLE OPERATING METHOD AND OPERATING SYSTEM USING SAME

(71) Applicant: KOREA AEROSPACE RESEARCH INSTITUTE, Daejeon (KR)

(72) Inventor: Dong Min Kim, Daejeon (KR)

(73) Assignee: KOREA AEROSPACE RESEARCH INSTITUTE

( * ) Notice: Subject to any disclaimer, the term of this patent is extended or adjusted under 35 U.S.C. 154(b) by 325 days.

(21) Appl. No.: 16/308,607

(22) PCT Filed: Nov. 15, 2016

(86) PCT No.: PCT/KR2016/013153
§ 371 (c)(1),
(2) Date: Dec. 10, 2018

(87) PCT Pub. No.: WO2017/213308
PCT Pub. Date: Dec. 14, 2017

(65) Prior Publication Data
US 2019/0152577 A1    May 23, 2019

(30) Foreign Application Priority Data

Jun. 8, 2016  (KR) .................... 10-2016-0070976
Jul. 20, 2016  (KR) .................... 10-2016-0092246

(51) Int. Cl.
*B64B 1/62*  (2006.01)
*B64B 1/30*  (2006.01)
(Continued)

(52) U.S. Cl.
CPC ............... *B64B 1/62* (2013.01); *B64B 1/30* (2013.01); *B64B 1/58* (2013.01); *B64B 1/66* (2013.01);
(Continued)

(58) Field of Classification Search
CPC ..... B64F 1/14; B64F 3/00; B64B 1/66; B64B 1/70; B64B 1/62; B64D 5/00; B64D 1/22; B64C 37/02
See application file for complete search history.

(56) References Cited

U.S. PATENT DOCUMENTS 1,634,964 A * 7/1927 Steinmetz ................ B64F 1/14
                                                                244/115
1,823,288 A * 9/1931 Powelson ................ B64F 1/14
                                                                244/116
(Continued)

FOREIGN PATENT DOCUMENTS

JP    2000289695 A    10/2000
JP    2001122193 A *   5/2001
(Continued)

OTHER PUBLICATIONS

International Search Report (PCT/ISA/210) dated Mar. 7, 2017, by the Korean Patent Office as the International Searching Authority for International Application No. PCT/KR2016/013153.
(Continued)

*Primary Examiner* — Joshua J Michener
*Assistant Examiner* — Colin Zohoori
(74) *Attorney, Agent, or Firm* — Buchanan Ingersoll & Rooney PC

(57) ABSTRACT

Provided is a flight vehicle operating method including: mooring a flight vehicle to a mooring unit by a cable; reducing a weight of the flight vehicle, increasing the flotage of the flight vehicle, or increasing the flotage of the flight vehicle while reducing the weight of the flight vehicle, by using a first flotation adjuster; floating the flight vehicle at a suitable altitude in the air; increasing the weight of the flight vehicle, reducing the flotage of the flight vehicle, or reducing the flotage of the flight vehicle while increasing the weight of the flight vehicle, by using a second flotation
(Continued)

adjuster or a propelling unit of the flight vehicle; and releasing the connection between the flight vehicle and the mooring unit and withdrawing the cable.

3 Claims, 19 Drawing Sheets

(51) Int. Cl.
*B64B 1/66* (2006.01)
*B64F 3/00* (2006.01)
*B64B 1/70* (2006.01)
*B64F 3/02* (2006.01)
*B64B 1/58* (2006.01)
*B64C 39/02* (2006.01)

(52) U.S. Cl.
CPC ............... *B64B 1/70* (2013.01); *B64C 39/02* (2013.01); *B64F 3/00* (2013.01); *B64F 3/02* (2013.01)

(56) References Cited

U.S. PATENT DOCUMENTS

| | | | | |
|---|---|---|---|---|
| 1,897,539 | A * | 2/1933 | Thorpe | B64F 1/14 |
| | | | | 244/116 |
| 6,231,007 | B1 * | 5/2001 | Schafer | B64B 1/22 |
| | | | | 244/127 |
| 9,580,173 | B1 * | 2/2017 | Burgess | B64D 1/22 |

FOREIGN PATENT DOCUMENTS

| | | | | |
|---|---|---|---|---|
| JP | 2001122193 | A | | 5/2001 |
| JP | 2001122194 | A | | 5/2001 |
| KR | 20040018614 | A | | 3/2004 |
| KR | 20100065856 | A * | 6/2010 | ............... B64F 1/14 |
| KR | 20100065856 | A | | 6/2010 |
| KR | 101009456 | B1 | | 1/2011 |

OTHER PUBLICATIONS

Notice of Allowance dated Sep. 22, 2016, by the Korean Patent Office for Application No. 10-2016-0070976.

Office Action dated Jan. 11, 2017, by the Korean Patent Office for Application No. 10-2016-0092246.

Written Opinion (PCT/ISA/237) dated Mar. 7, 2017, by the Korean Patent Office as the International Searching Authority for International Application No. PCT/KR2016/013153.

* cited by examiner

FLIGHT VEHICLE OPERATING METHOD AND OPERATING SYSTEM USING SAME

TECHNICAL FIELD

The present disclosure relates to flight vehicle operating methods and flight vehicle operating systems using the same, and more particularly, to flight vehicle operating methods and flight vehicle operating systems using the same, which are for operating flight vehicles capable of functioning as aerostats and airships.

BACKGROUND ART

In general, an aerostat is a flight vehicle that performs missions such as surveillance, observation, and communication relay at high altitudes by using video equipment, radars, and other aviation sensors. The aerostat may require a variety of equipment related to mooring as well as a wide space for mooring in the process of performing missions while flying at high altitudes for a long time. In addition, it may be quite difficult to install the aerostat on the ground or the like, and moving the installed aerostat to other places may take much time and have a high cost.

Meanwhile, an airship is a flight vehicle that may fly to desired positions by having a propelling device while floating in the air mainly through the use of flotage. The airship may have good mobility and may be deployed in a timely manner but may have difficulty in performing a long-term mission due to its limited flight duration.

DESCRIPTION OF EMBODIMENTS

Technical Problem

Provided are flight vehicle operating methods and flight vehicle operating systems using the same, which are for operating flight vehicles capable of functioning as aerostats and airships. However, these problems are merely examples, and the scope of the present disclosure is not limited thereto.

Solution to Problem

According to an aspect of the present disclosure, a flight vehicle operating method includes: an operation (a) of flying a flight vehicle toward a mooring unit located below the flight vehicle; an operation (b) of mooring the flight vehicle to the mooring unit by connecting the flight vehicle and the mooring unit to each other by a cable; an operation (c) of reducing a weight of the flight vehicle, increasing the flotage of the flight vehicle, or increasing the flotage of the flight vehicle while reducing the weight of the flight vehicle, by using a first flotation adjuster; an operation (d) of floating the flight vehicle at a suitable altitude in the air; an operation (e) of increasing the weight of the flight vehicle, reducing the flotage of the flight vehicle, or reducing the flotage of the flight vehicle while increasing the weight of the flight vehicle, by using a second flotation adjuster or a propelling unit of the flight vehicle; and an operation (f) of releasing the connection between the flight vehicle and the mooring unit and withdrawing the cable.

The operation (c) may includes an operation of reducing the weight of the flight vehicle by lowering the first flotation adjuster or by unloading the first flotation adjuster from the flight vehicle by discharging the first flotation adjuster to the outside, and the operation (e) may include an operation of increasing the weight of the flight vehicle by loading the second flotation adjuster into the flight vehicle by raising the second flotation adjuster, or reducing the flotage of the flight vehicle by unloading the second flotation adjuster from the flight vehicle by discharging the second flotation adjuster to the outside.

According to another aspect of the present disclosure, a flight vehicle operating method includes: an operation (a) of flying a flight vehicle toward a mooring unit located below the flight vehicle; an operation (b) of lowering the flight vehicle by adjusting the size of a vertical component force of a propulsion force supplied from a propelling unit of the flight vehicle, the vertical component force acting in a gravity direction; an operation (c) of mooring the flight vehicle to the mooring unit by connecting the flight vehicle and the mooring unit to each other by a cable; an operation (d) of floating the flight vehicle at a suitable altitude in the air; an operation (e) of lowering the flight vehicle by adjusting the size of a vertical component force of a propulsion force supplied from the propelling unit of the flight vehicle, the vertical component force acting in the gravity direction; and an operation (f) of releasing the connection between the flight vehicle and the mooring unit and withdrawing the cable.

The operation (b) and the operation (e) may include adjusting an angle formed between the gravity direction and a rotation shaft of at least one propeller included in the propelling unit, or controlling rotation of at least one first propeller generating the vertical component force and controlling rotation of at least one second propeller generating a horizontal component force acting in a direction perpendicular to the vertical component force.

The mooring of the flight vehicle to the mooring unit may include guiding the cable to the mooring unit by using a guide unit installed at an end portion of the cable.

The flight vehicle operating method may further include raising or lowering the flight vehicle by winding or unwinding the cable by rotating a mooring winding unit installed in the mooring unit.

According to another aspect of the present disclosure, a flight vehicle operating system includes: a flight vehicle configured to fly and float in the air; a mooring unit located below the flight vehicle; a cable connected to the flight vehicle and the mooring unit such that the flight vehicle is moored to the mooring unit; and a flotation adjuster which is loaded or unloaded into or from the flight vehicle to change at least one of a weight of the flight vehicle and the flotage of the flight vehicle.

The flotation adjuster may include a plurality of rollers and a motor, and the plurality of rollers may be rotated by the motor to rise or fall along the cable to change the weight of the flight vehicle.

The flotation adjuster may include a drone, and the drone may rise or fall to change the weight of the flight vehicle.

The flotation adjuster may include a winding unit configured to wind the cable therearound, and the winding unit may rise or fall to change the weight of the flight vehicle.

The flotation adjuster may include liquid or sand, and the liquid or sand may be discharged to the outside to reduce the weight of the flight vehicle.

The flotation adjuster may include helium or hydrogen, and the helium or hydrogen may be discharged to outside to reduce the flotage of the flight vehicle.

The flight vehicle operating system may further include a guide unit installed at an end portion of the cable and which guides the cable to the mooring unit.

The flight vehicle operating system may further include a mooring winding unit installed in the mooring unit and which winds or unwinds the cable to thereby raise or lower the flight vehicle.

According to another aspect of the present disclosure, a flight vehicle operating system includes: a flight vehicle configured to fly and float in the air; a mooring unit located below the flight vehicle; a cable connected to the flight vehicle and the mooring unit such that the flight vehicle is moored to the mooring unit; and a propelling unit configured to supply the flight vehicle with a propulsion force having a vertical component force acting in a gravity direction.

The propelling unit may include a propulsion controller which adjusts a size of the vertical component force to control a direction of the propulsion force.

The propelling unit may include at least one propeller, and the propulsion controller may adjust an angle formed between the gravity direction and a rotation shaft of the at least one propeller.

The propelling unit may include at least one first propeller that generates the vertical component force and at least one second propeller that generates a horizontal component force acting in a direction perpendicular to the vertical component force, and the propulsion controller may control rotation of the at least one first propeller and the at least one second propeller to thereby control a direction of the propulsion force.

The flight vehicle operating system may further include a guide unit installed at an end portion of the cable and which guides the cable to the mooring unit.

The flight vehicle operating system may further include a mooring winding unit installed in the mooring unit and which winds or unwinds the cable to thereby raise or lower the flight vehicle.

Advantageous Effects of Disclosure

According to an embodiment of the present disclosure described above, a flight vehicle capable of functioning as an aerostat and an airship may be easily operated.

Also, since a flight vehicle capable of long-term flight at high altitudes may be deployed in a timely manner, a mission accomplishment may be improved.

However, the scope of the present disclosure is not limited to these effects.

BEST MODE

Figure 1:
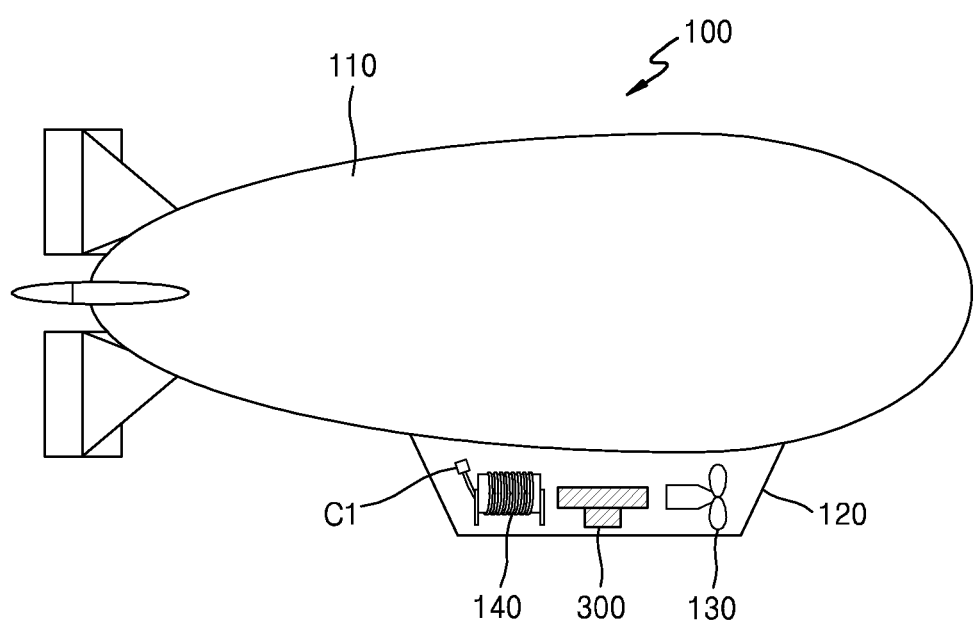
FIG. 1 is a conceptual diagram illustrating a flight vehicle included in a flight vehicle operating system according to an embodiment of the present disclosure.

The present disclosure may include various embodiments and modifications, and certain embodiments thereof are illustrated in the drawings and will be described herein in detail. However, it will be understood that the present disclosure is not limited to the embodiments and includes all modifications, equivalents, and substitutions falling within the spirit and scope of the present disclosure. In the following description, detailed descriptions of well-known functions or configurations will be omitted since they would unnecessarily obscure the subject matters of the present disclosure.

Although terms such as "first" and "second" may be used herein to describe various elements or components, these elements or components should not be limited by these terms. These terms are only used to distinguish one element or component from another element or component.

Hereinafter, embodiments of the present disclosure will be described in detail with reference to the accompanying drawings. In the following description, like reference numerals will be used to denote like elements, and redundant descriptions thereof will be omitted for conciseness. In the drawings, thicknesses are enlarged to clearly represent layers and regions. Also, in the drawings, the thicknesses of some layers and regions are exaggerated for convenience of description.

FIG. 1 is a conceptual diagram illustrating a flight vehicle constituting a flight vehicle operating system according to an embodiment of the present disclosure, and FIGS. 2 to 7 are conceptual diagrams sequentially illustrating a flight vehicle operating method using the flight vehicle operating system of FIG. 1.

Figure 2:
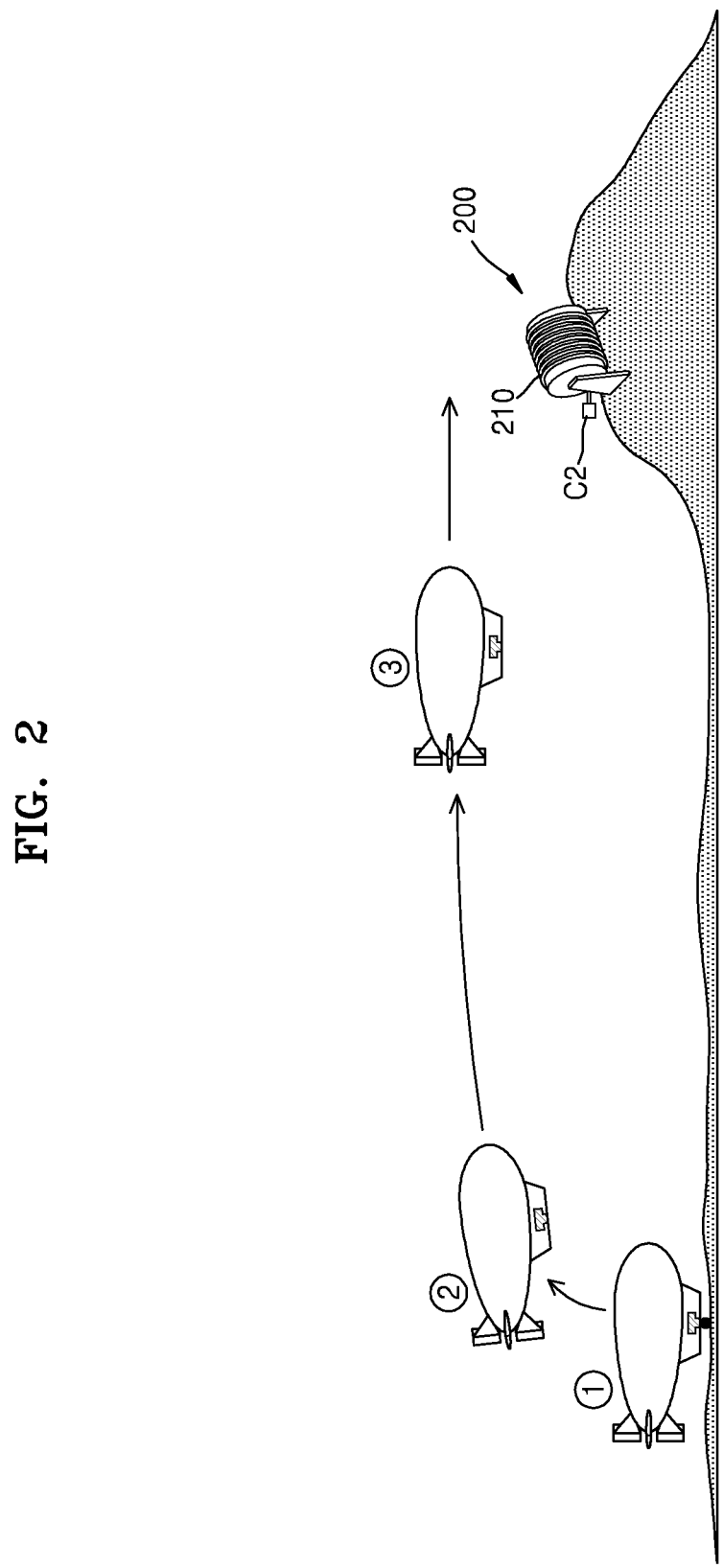
FIGS. 2 to 7 are conceptual diagrams sequentially illustrating a flight vehicle operating method using the flight vehicle operating system of FIG. 1.

First, referring to FIGS. 1 and 2, a flight vehicle operating system according to an embodiment of the present disclosure may include a flight vehicle 100, a mooring unit 200, a cable C1, and a flotation adjuster 300.

Herein, the flight vehicle 100 may fly and float in the air by flotage and may be in the form of, for example, an airship. However, the present disclosure is not limited thereto, and the flight vehicle 100 may be any type of flight vehicle including an auxiliary power unit in a non-powered flight vehicle. Hereinafter, for convenience of description, the case where the flight vehicle 100 is an airship will be mainly described in detail.

The flight vehicle 100 may include an envelope 110 and a gondola 120. The envelope 110 may be filled with gas, and by the flotage provided by the envelope 110, the flight vehicle 100 may be floated in the air for a long time to perform various missions such as surveillance, observation, and communication relay. The envelope 110 may be filled with various types of gas lighter than air, such as helium, hydrogen, or the like. Also, the flight vehicle 100 may further include an air envelope (not illustrated) for adjusting the pressurization of the envelope 110 or adjusting the longitudinal attitude of the flight vehicle 100.

A gondola 120 may be arranged under the envelope 110, and the gondola 120 may include at least one fan or propeller 130 driven by an engine (not illustrated). The fan or propeller 130 may provide power for propelling the flight vehicle 100. Also, the gondola 120 may include a winding unit 140 around which the cable C1 is wound and the flotation adjuster 300. The winding unit 140 and the flotation adjuster 300 may be arranged in the gondola 120. In this case, the gondola 120 may have a closable opening (not illustrated) such that the cable C1 wound around the winding unit 140 and the flotation adjuster 300 may be loaded/unloaded into/from the flight vehicle 100. However, the present disclosure is not limited thereto, and the winding unit 140 and the flotation adjuster 300 may be arranged outside the gondola 120 and then loaded/unloaded thereinto/therefrom.

Although not illustrated in FIG. 1 and the like, the flight vehicle 100 may further include a sensor for measuring the pressure inside the envelope 110, various measurement equipment for performing various missions such as surveillance, observation, and communication relay of the flight vehicle 100, a mission payload, and the like.

As illustrated in ① of FIG. 2, the flight vehicle 100 may land or moor at a particular point and then take off to move to a point where the flight vehicle 100 is required to perform a mission. In this case, the flight vehicle 100 may rise from a takeoff point by the flotage of the gas stored in the envelope 110 or by a combination of the flotage of gas and the propulsion force of a propelling device. The takeoff point may be a future landing point. In this case, the landing point may be a point located on the ground, or may be a point located on one surface of a ship or float. As illustrated in ② of FIG. 2, when the flight vehicle 100 rises to a certain height, the flight vehicle 100 may move toward a mission point by the propulsion force generated from the propelling device including the fan or the propeller 130. Thereafter, as illustrated in ③ of FIG. 2, the flight vehicle 100 may reach a point where the mooring unit 200 is located (i.e., the mission point). In this case, the mooring unit 200 may include a mooring winding unit 210 around which a mooring cable C2 is wound, like the winding unit 140 included in the flight vehicle 100.

Figure 3:
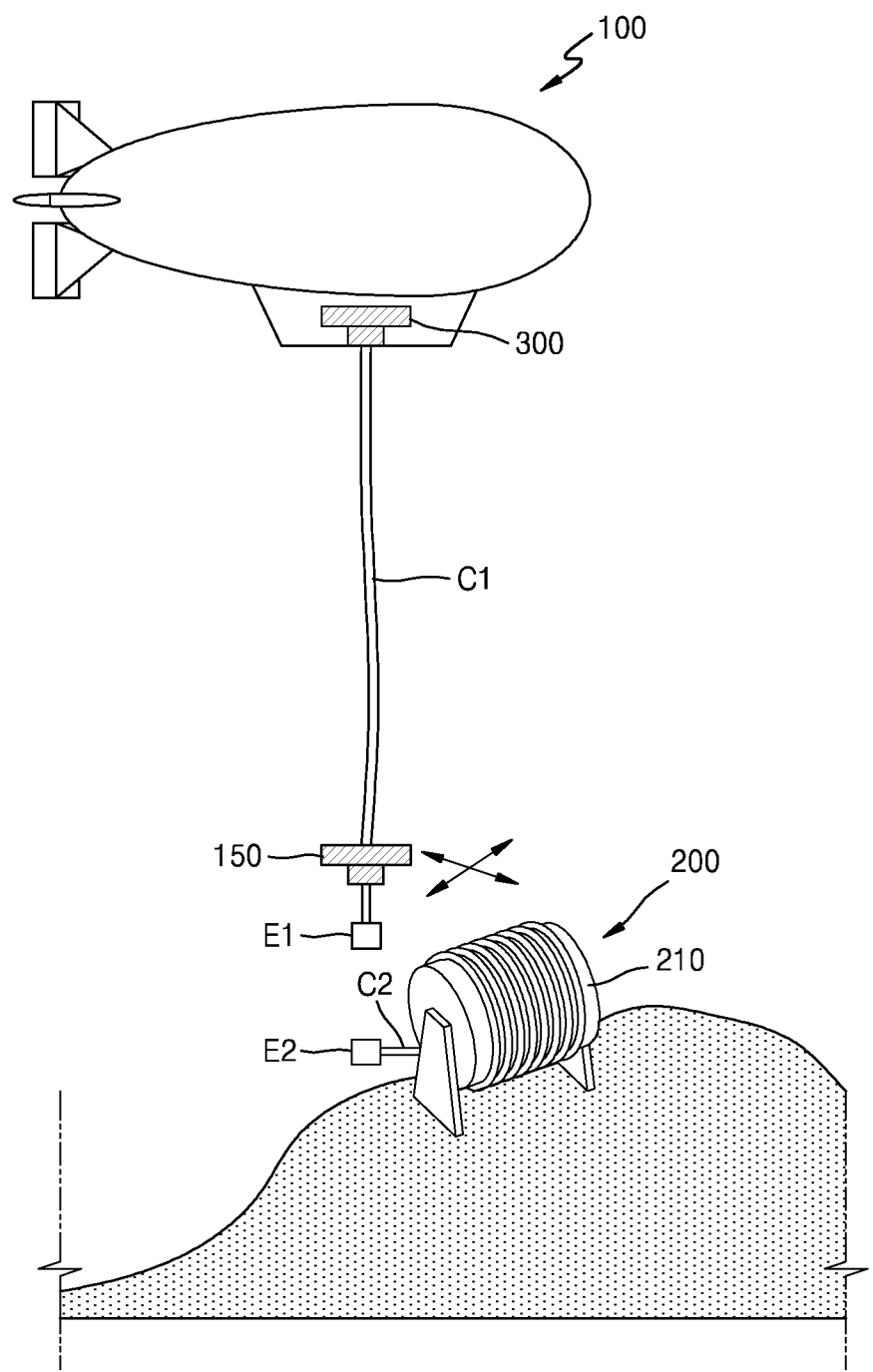

Thereafter, as illustrated in FIG. 3, the flight vehicle 100 including the flotation adjuster 300 may transfer the cable C1 toward the mooring unit 200 located under the flight vehicle 100. In this case, the cable C1 may be transferred by the winding unit 140 illustrated in FIG. 1. Meanwhile, the flotation adjuster 300 illustrated in FIG. 3 may be a flotation adjuster unloaded from the flight vehicle 100, and will hereinafter be referred to as a first flotation adjuster 300. A guide unit 150 may be installed at an end portion E1 of the cable C1, and the cable C1 may be guided by the guide unit 150 to the mooring unit 200, particularly to an end portion E2 of the mooring cable C2. In an embodiment, the guide unit 150 may include a motor (not illustrated) and a propeller (not illustrated) that are electrically driven. The motor and the propeller may be controlled by a wireless signal or an automatic position control device to guide the end portion E1 of the cable C1 to a desired position.

Particularly, the guide unit 150 may be located over the end portion E1 of the cable C1, and the guide unit 150 and the end portion E1 may be spaced apart from each other by a certain distance. Accordingly, the end portion E1 of the cable C1 may be easily thrown to the end portion E2 of the mooring cable C2. However, since the flight vehicle 100 may also rise due to the instantaneous rise of the guide unit 150, it may be necessary to suitably control the movement of the guide unit 150 so that the guide unit 150 may not rise excessively.

As such, by guiding the end portion E1 of the cable C1 to the end portion E2 of the mooring cable C2 by suitably controlling the movement of the guide unit 150, the end portion E1 of the cable C1 may be stably connected to the end portion E2 of the mooring cable C2. Accordingly, the flight vehicle 100 may be moored to the mooring unit 200 despite the vibration caused by draft, flotage, or the like. However, the present disclosure is not limited thereto, and the cable C1 may be directly wound around or connected to the mooring unit 200 without the mooring cable C2. Hereinafter, for convenience of description, the case where the cable C1 and the mooring cable C2 are connected will be mainly described in detail.

Although not illustrated in FIG. 3, the end portion E1 of the cable C1 may be formed in the shape of a hook, a ring, or the like to be connected to the end portion E2 of the mooring cable C2. Also, a power line and/or a signal line may be embedded in each of the cable C1 and the mooring cable C2 and thus the power line and/or the signal line of the cable C1 and the power line and/or the signal line of the mooring cable C2 may be fastened to each other in the form of a connector. Accordingly, a control signal may be transmitted to the flight vehicle 100 or data may be received from the flight vehicle 100 through the signal line, and power may be supplied to the flight vehicle 100 through the power line.

Figure 4:
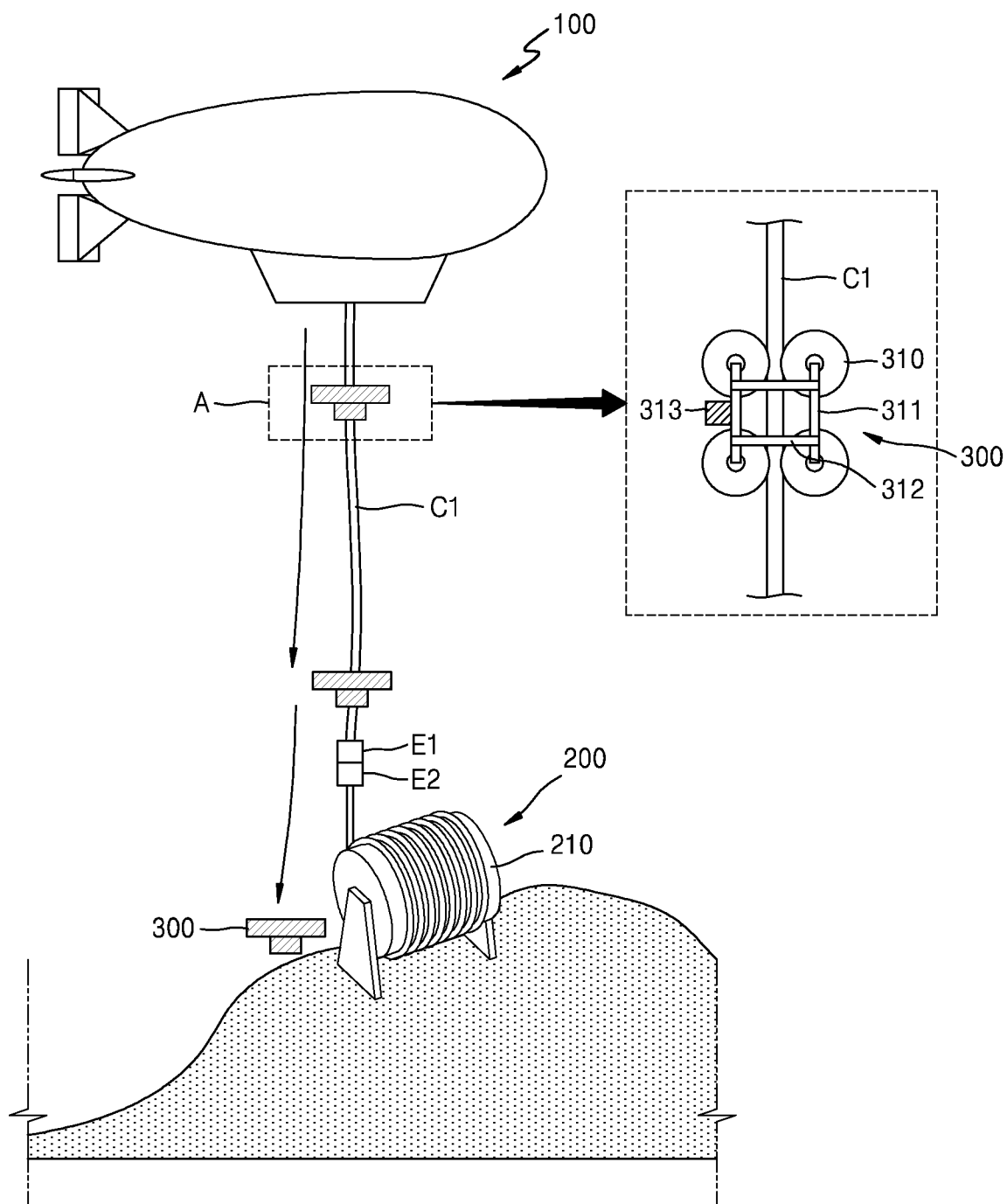

Thereafter, as illustrated in FIG. 4, the first flotation adjuster 300 may be unloaded from the flight vehicle 100. As such, as the first flotation adjuster 300 falls, the weight of the flight vehicle 100 may decrease and thus the floatability of the mooring flight vehicle 100 may be improved such that the flight vehicle 100 may fly for a long period.

In an embodiment, as illustrated in an enlarged view of a portion A of FIG. 4, the first flotation adjuster 300 may include a plurality of rollers 310 and a motor 313. The plurality of rollers 310 may be arranged on both sides of the cable C1 to rise or fall along the cable C1, and a first connection unit 311 extending horizontally and a second connection unit 312 extending vertically may connect the adjacent rollers 310. The first connection unit 311 and the second connection unit 312 may support the plurality of rollers 310 and the motor 313 and may be fastened to each other by screws, bolts, or the like. The number of rollers 310 may vary according to the weight percentage of the flight vehicle 100 to be adjusted, and the number and arrangement of first and second connection units 311 and 312 may also vary according to embodiments. The first flotation adjuster 300 may be driven by the motor 313. Particularly, the plurality of rollers 310 may be rotated by the motor 313 and thus the first flotation adjuster 300 may fall along the cable C1. Thereafter, the first flotation adjuster 300 may be separated from the cable C1 and/or the mooring cable C2.

Figure 5:
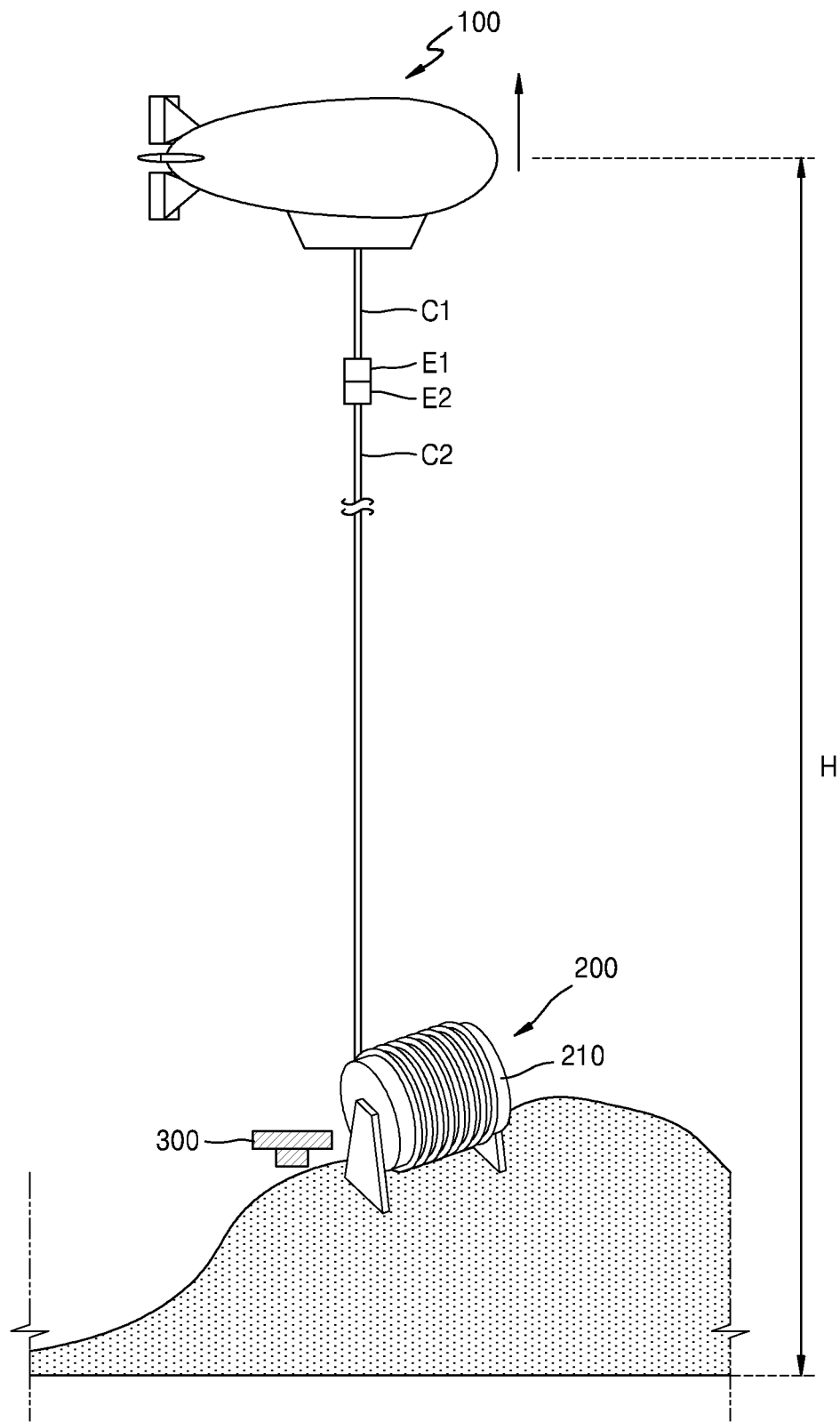

Thereafter, as illustrated in FIG. 5, the flight vehicle 100 may float at a suitable altitude H to perform a given mission. Herein, the suitable altitude H may be a height at which the flight vehicle 100 is suitable for performing a mission such as surveillance, observation, or communication relay, and may be an altitude below a pressure altitude that is a maximum altitude that may be implemented by the gas inside the envelope 110.

Particularly, when the first flotation adjuster 300 is unloaded from the flight vehicle 100 to reduce the weight of the flight vehicle 100, when the winding of the mooring cable C2 is released, the flight vehicle 100 may rise to the suitable altitude H for mission performance and may also fly for a long period. The winding of the cable C1 connected to the mooring cable C2 may be released instead of the winding of the mooring cable C2, or the windings of the cable C1 and the mooring cable C2 may be released together.

Figure 6:
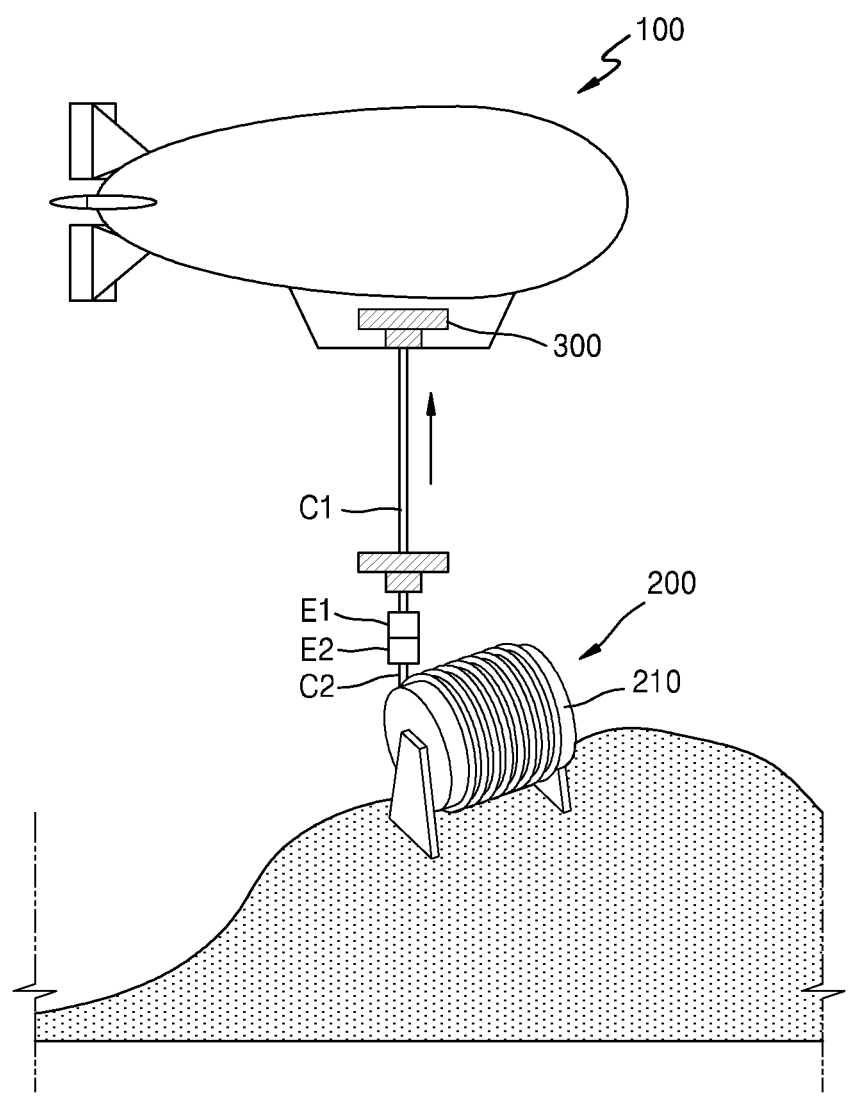

Thereafter, as illustrated in FIG. 6, the flight vehicle 100 that has completed the mission may fall again due to the winding of the mooring cable C2 or the like to load a second flotation adjuster thereinto. That is, the mooring cable C2, which has been unwound and transferred upward in the rising process of the flight vehicle 100, may be again wound around the mooring winding unit 210 and transferred downward to lower the flight vehicle 100. Meanwhile, the second flotation adjuster may be the same as the first flotation adjuster 300 illustrated in FIG. 4, and the unloaded first flotation adjuster may be used as the second flotation adjuster so far as possible in view of cost, flight environment consistency, and the like. Hereinafter, the case where the second flotation adjuster is the same as the first flotation adjuster 300 will be mainly described, and the name and symbol of the first flotation adjuster will be used instead of those of the second flotation adjuster. This may also apply to the following embodiments and modifications thereof.

The first flotation adjuster 300 may have a structure illustrated in the enlarged view of the portion A of FIG. 4. In this case, the first flotation adjuster 300 may rise or fall along the cable C1 as in the previous unloading operation. Accordingly, the first flotation adjuster 300 may be loaded into the flight vehicle 100 to increase the weight of the flight vehicle 100, and the flight vehicle 100 may have a weight suitable for flying. Also, by loading fuel together with the first flotation adjuster 300, the fuel amount of the flight vehicle 100 may be supplemented to increase the operation time thereof.

Figure 7:
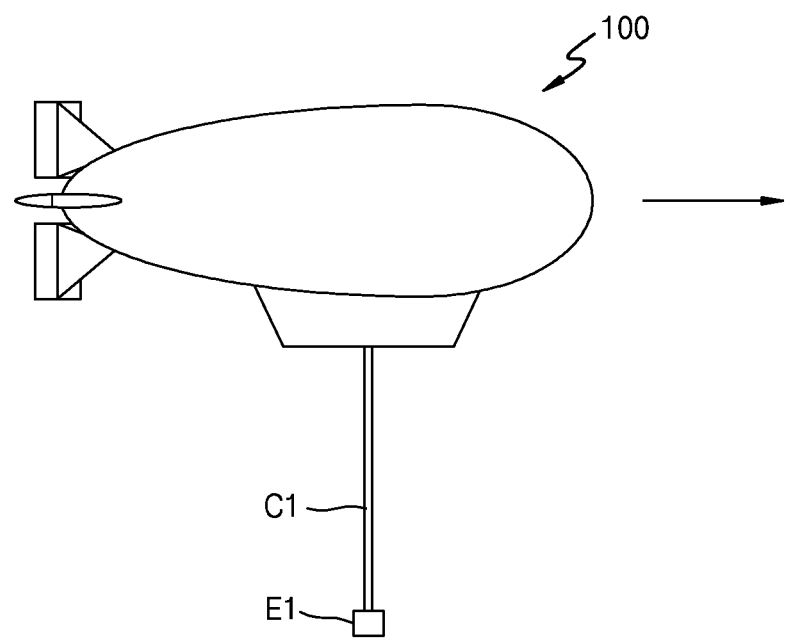
Figure 7:
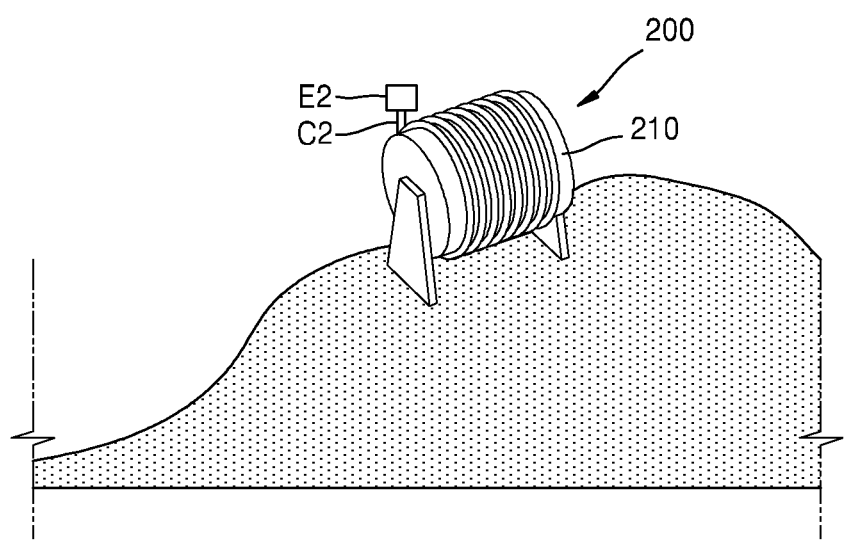

Thereafter, as illustrated in FIG. 7, the connection between the flight vehicle 100 and the mooring unit 200 may be released. Particularly, the connection between the end portion E1 of the cable C1 and the end portion E2 of the mooring cable C2 may be released, and the cable C1 may be withdrawn to the flight vehicle 100. Accordingly, the flight vehicle 100 may be the same as or similar to the state illustrated in ③ of FIG. 2 and may fly to the original takeoff point or to another mission point.

Figure 8:
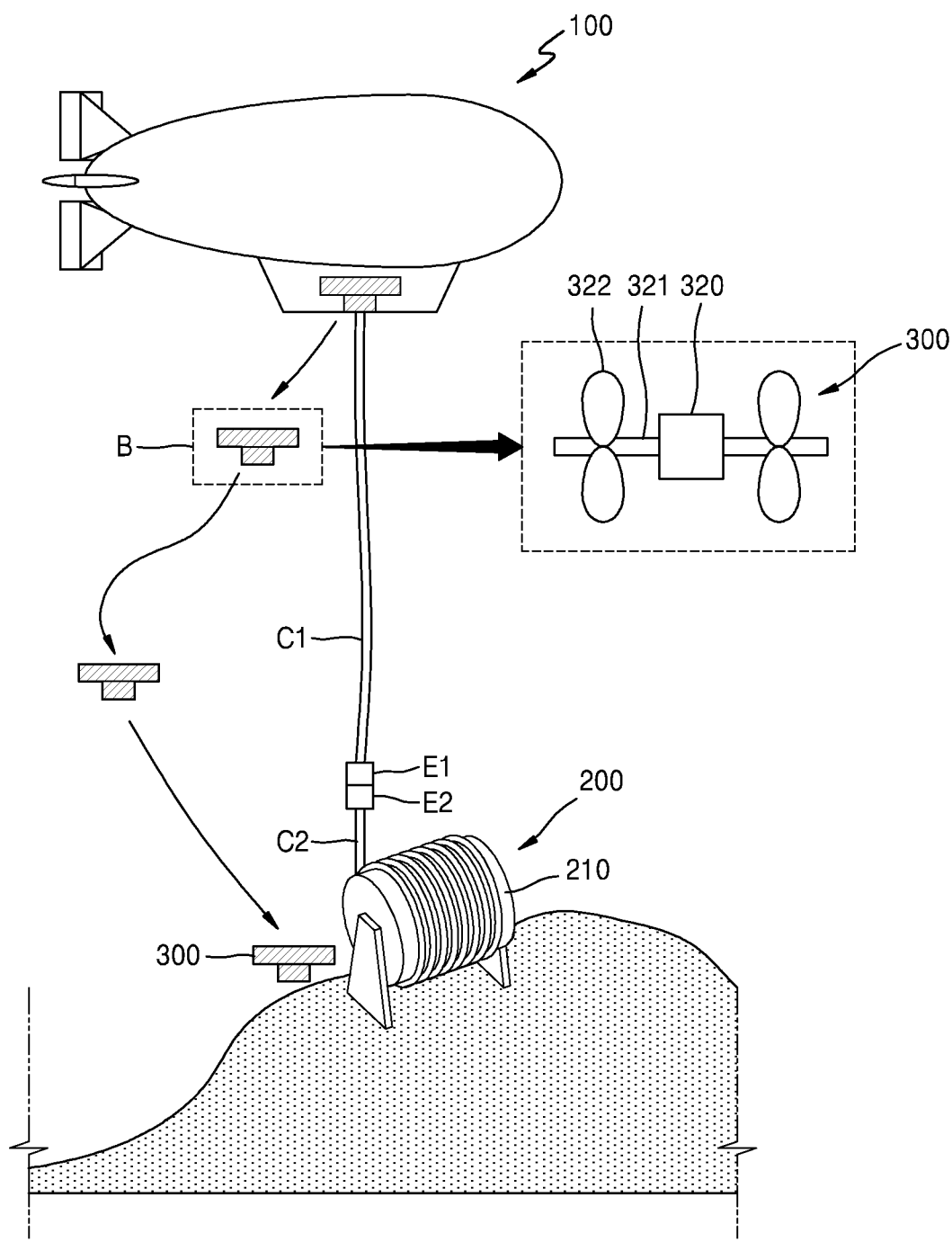
FIG. 8 is a conceptual diagram illustrating a flight vehicle operating system according to another embodiment of the present disclosure.
Figure 9:
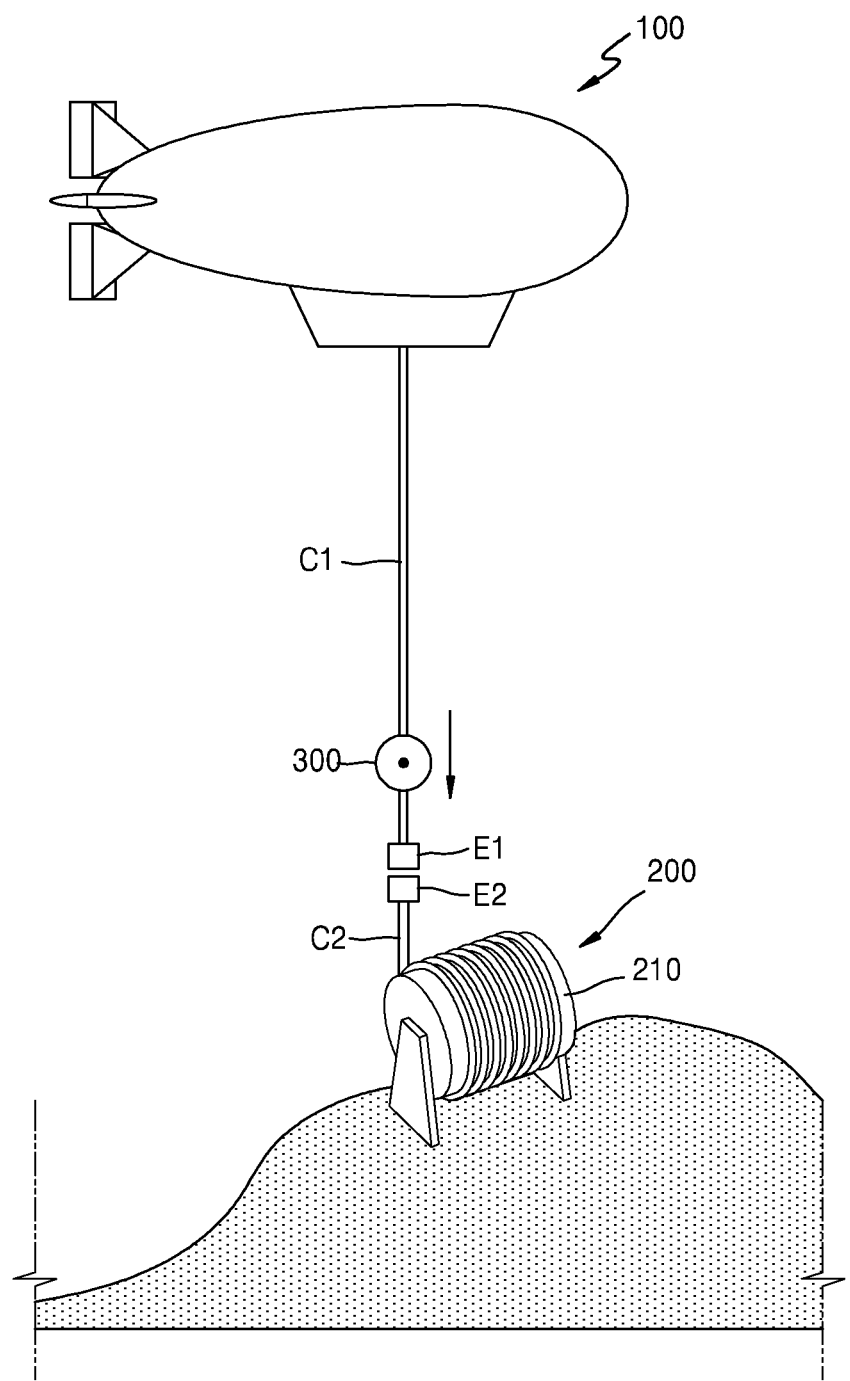
FIG. 9 is a conceptual diagram illustrating a flight vehicle operating system according to another embodiment of the present disclosure.

FIG. 8 is a conceptual diagram illustrating a flight vehicle operating system according to another embodiment of the present disclosure, and FIG. 9 is a conceptual diagram illustrating a flight vehicle operating system according to another embodiment of the present disclosure. Herein, FIGS. 8 and 9 illustrate other embodiments of the first flotation adjuster 300 described above with reference to FIG. 4 and/or FIG. 6. Hereinafter, for convenience of description, the embodiments illustrated in FIGS. 8 and 9 will be described in detail, focusing on differences from the above embodiments.

First, referring to FIG. 8, the first flotation adjuster 300 may be formed in the shape of a drone. That is, the first flotation adjuster 300 may include a main body 320, a support unit 321, and a vane unit 322 as illustrated in an enlarged view of a portion B of FIG. 8. The main body 320 may include a controller (not illustrated) arranged at the center of the first flotation adjuster 300 to receive a remote signal or the like and control the flight of the first flotation adjuster 300. A plurality of support units 321 extending outside the main body 320 may be arranged on both sides of the main body 320, and the vane unit 322 may be arranged at an end portion of each of the plurality of support units 321. Accordingly, the first flotation adjuster 300 may fly substantially downward to reduce the weight of the flight vehicle 100. Although FIG. 8 illustrates that the first flotation adjuster 300 flies spaced apart from the cable C1, the present disclosure is not limited thereto. That is, the first flotation adjuster 300 may fly along the cable C1. For example, by passing the cable C1 through a through hole (not illustrated) formed in the main body 320, the first flotation adjuster 300 may move along the cable C1. As such, when the first flotation adjuster 300 moves along the cable C1, the first flotation adjuster 300 may be simplified to only rise or fall.

Thereafter, the first flotation adjuster 300 may again be loaded into the flight vehicle 100 by flying substantially upward, and thus the weight of the flight vehicle 100 may increase again. Meanwhile, the first flotation adjuster 300 of the present embodiment may be used only in the current loading operation, not in the unloading operation described above. That is, in the unloading operation, the first flotation adjuster 300 may be unloaded from the flight vehicle 100 by an operating method according to another embodiment, and in the loading operation, the first flotation adjuster 300 may be loaded into the flight vehicle 100 by an operating method according to the present embodiment, that is, by using a drone.

Also, the first flotation adjuster 300 of the present embodiment may be used as the guide unit 150 illustrated in FIG. 3. That is, in a state where the cable C1 passes through the main body 320 of the first flotation adjuster 300, the first flotation adjuster 300 may be controlled by a radio signal, an automatic position control device, or the like to guide the end portion E1 of the cable C1 to the end portion E2 of the mooring cable C2.

Next, referring to FIG. 9, the first flotation adjuster 300 may include a winding unit configured to wind the cable C1 therearound. The winding unit may be formed in the shape of a mobile winch or the like, and the first flotation adjuster 300 may be installed at the cable C1 to be transferred downward together with the cable C1. Thus, in the unloading operation, the first flotation adjuster 300 may reduce the weight of the flight vehicle 100 and also transfer the cable C1 downward.

Thereafter, in the loading operation, the first flotation adjuster 300 may be transferred upward together with the cable C1 to be loaded into the flight vehicle 100. The first flotation adjuster 300 may increase the weight of the flight vehicle 100 and also transfer the cable C1 upward.

The winding unit included in the first flotation adjuster 300 may be a motor-driven device, and the winding unit may operate by receiving a voltage from a ground power supply (not illustrated) arranged in the mooring unit 200. Thus, the first flotation adjuster 300 may rise or fall together with the cable C1 by a driving voltage of the ground power supply.

Meanwhile, the first flotation adjuster 300 of the present embodiment may be used as the winding unit 140 illustrated in FIG. 1. That is, as the first flotation adjuster 300 moves upward while winding the cable C1, the first flotation adjuster 300 may perform a function of withdrawing the cable C1.

Figure 10:
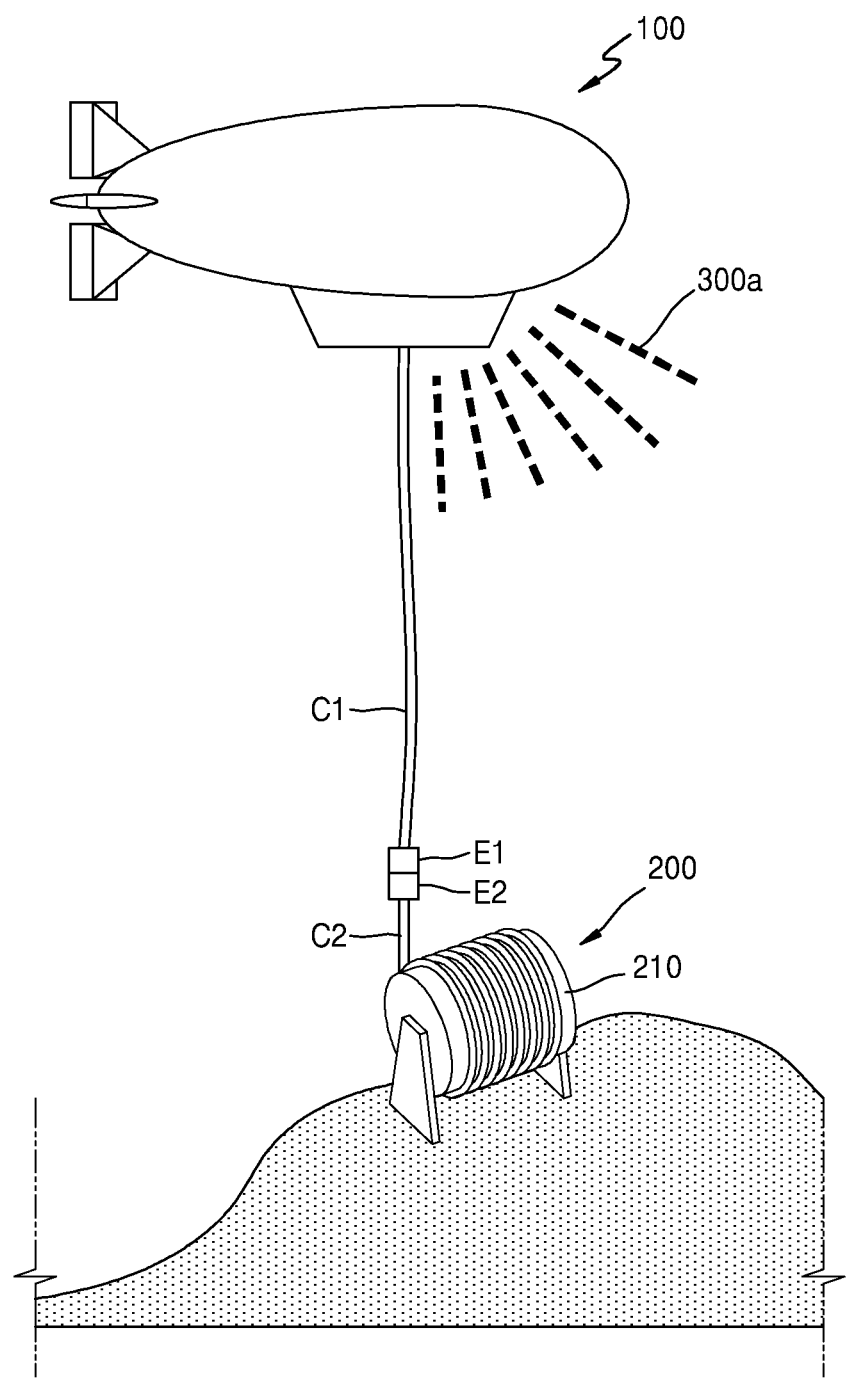
FIG. 10 is a conceptual diagram illustrating a flight vehicle operating system according to another embodiment of the present disclosure.
Figure 11:
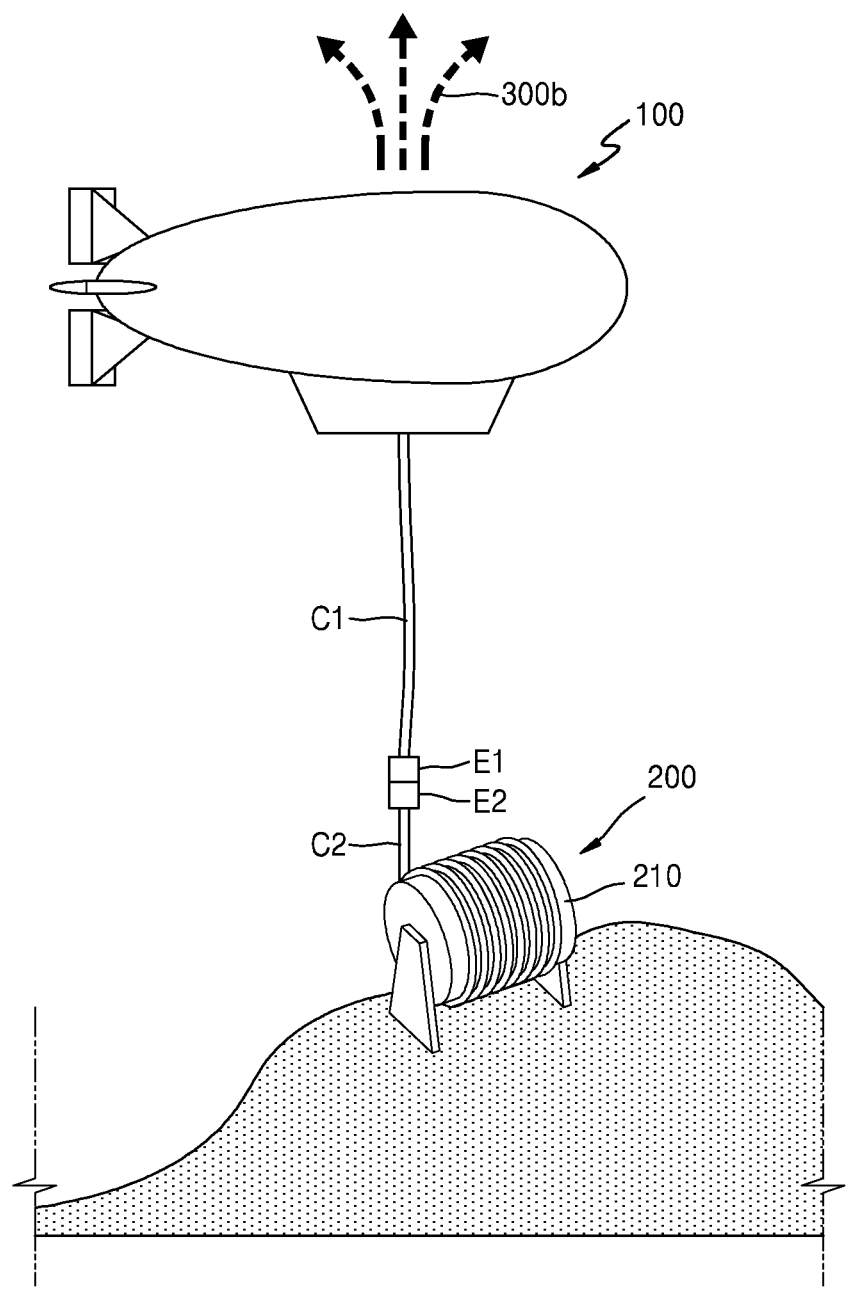
FIG. 11 is a conceptual diagram illustrating a flight vehicle operating system according to another embodiment of the present disclosure.

FIG. 10 is a conceptual diagram illustrating a flight vehicle operating system according to another embodiment of the present disclosure, and FIG. 11 is a conceptual diagram illustrating a flight vehicle operating system according to another embodiment of the present disclosure. In the previous embodiments, the case where the second flotation adjuster is the same as the first flotation adjuster has been mainly described in view of cost, flight environment consistency, and the like. However, as for the embodiments illustrated in FIGS. 10 and 11, since the case where the second flotation adjuster is different from the first flotation adjuster is more general, the case where the second flotation adjuster is different from the first flotation adjuster will be mainly described below. However, in the embodiments illustrated in FIGS. 10 and 11, the case where the second flotation adjuster is the same as the first flotation adjuster is not completely excluded.

First, referring to FIG. 10, a first flotation adjuster 300a may be discharged to outside in an unloading operation to reduce the weight of the flight vehicle 100. In this case, the first flotation adjuster 300a may include a liquid such as water or a powder product such as sand and include any material that is harmless to the external environment and is easy to discharge.

Thereafter, water or sand may be resupplied to the flight vehicle 100 in a loading operation. However, in view of cost and equipment for resupplying water or sand, a second flotation adjuster (not illustrated) loaded into the flight vehicle 100 in the loading operation may be selected from the flotation adjuster including the rollers and the motor illustrated in FIG. 4, the flotation adjuster including the drone illustrated in FIG. 8, and the flotation adjuster including the winding unit illustrated in FIG. 9.

Next, referring to FIG. 11, as in the embodiment of FIG. 10, a flotation adjuster of the present embodiment may be discharged to outside. However, unlike in the embodiment of FIG. 10, in the present embodiment, the flotation adjuster discharged to outside may mean a second flotation adjuster.

Particularly, although not illustrated in FIG. 11, the first flotation adjuster may be unloaded from the flight vehicle 100 in a first operation. In this case, the first flotation adjuster may be in the form of a flotation adjuster including the rollers and the motor illustrated in FIG. 4, a flotation adjuster including the drone illustrated in FIG. 8, or a flotation adjuster including the winding unit illustrated in FIG. 9.

Thereafter, the flight vehicle 100 may perform a given mission by floating at a suitable altitude as illustrated in FIG. 5, and then the flight vehicle 100 may unload a second flotation adjuster 300b as illustrated in FIG. 11. In this case, the flight vehicle 100 may not need to be lowered toward the mooring unit 200, and the connection between the cable C1 and the mooring cable C2 may be released according to a remote signal or the like to fly the flight vehicle 100 with suitable flotage.

In the unloading operation of the second flotation adjuster, the second flotation adjuster 300b may be discharged to outside. However, unlike in the previous embodiments, the weight of the flight vehicle 100 may not be changed but the flotage of the flight vehicle 100 may be reduced due to the discharge of the second flotation adjuster 300b. For this purpose, the second flotation adjuster 300b may include helium or hydrogen for generating flotage in the flight vehicle 100, and may also include any gas that is lighter than air and may be stored in an envelope (not illustrated) of the flight vehicle 100.

Meanwhile, instead of attempting to reduce the weight of the flight vehicle 100 in the operation of unloading the first flotation adjuster, the flight vehicle 100 may be loaded with helium or hydrogen to increase the flotage of the flight vehicle 100. However, in view of the complexity and risk of the process of transferring and injecting helium or hydrogen into the envelope of a flight vehicle, instead of increasing the flotage of the flight vehicle 100, the weight of the flight vehicle 100 may be reduced by unloading the first flotation adjuster.

MODE OF DISCLOSURE

Figure 12:
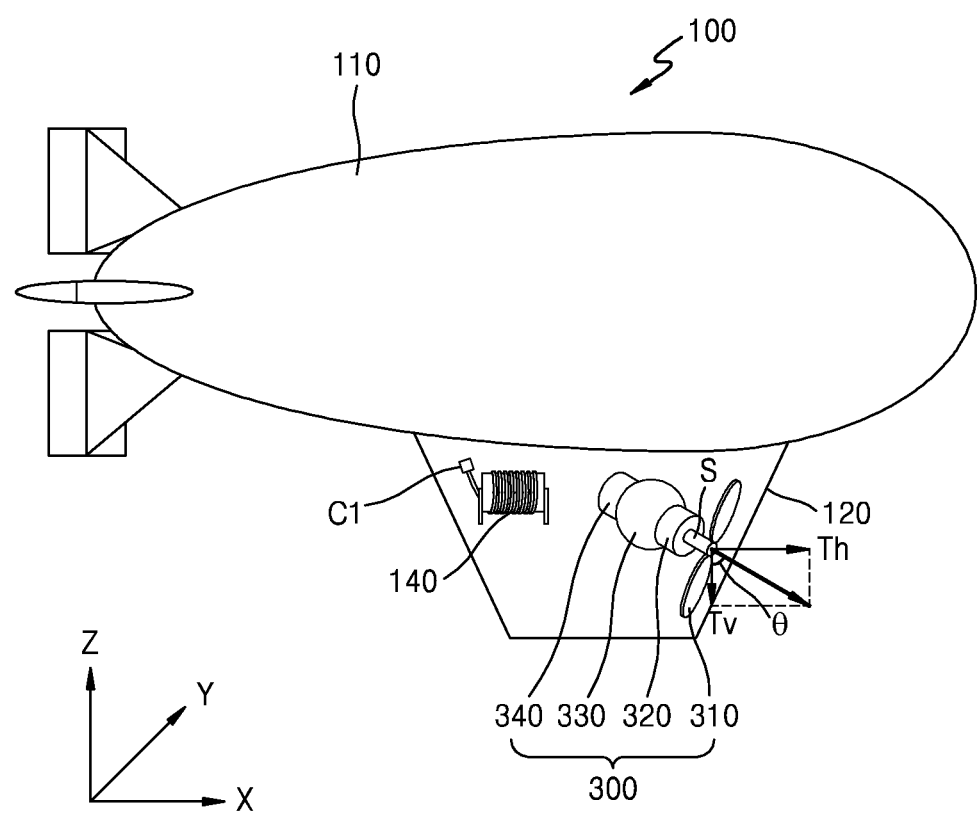
FIG. 12 is a conceptual diagram schematically illustrating a flight vehicle included in a flight vehicle operating system according to another embodiment of the present disclosure.
Figure 13:
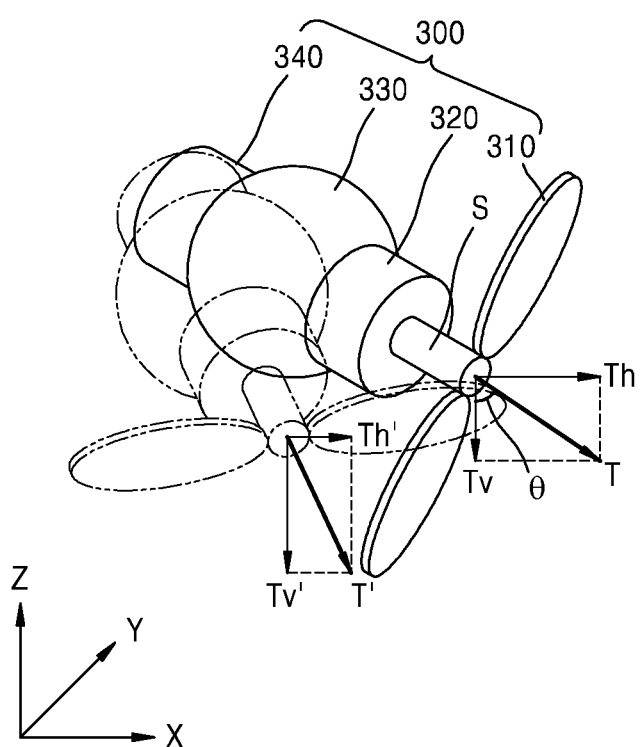
FIG. 13 is an enlarged view schematically illustrating a propelling unit of FIG.

FIG. 12 is a conceptual diagram schematically illustrating a flight vehicle constituting a flight vehicle operating system according to another embodiment of the present disclosure, and FIG. 13 is an enlarged view schematically illustrating a propelling unit of FIG. 12.

Referring to FIGS. 12 and 13, a flight vehicle operating system according to another embodiment of the present disclosure may include a flight vehicle 100, a cable C1, a mooring unit (not illustrated), and a propelling unit 300. In this case, the mooring unit may be located on a bottom surface corresponding to a flotation point of the flight vehicle 100 to moor the flight vehicle 100 by the cable C1 in order to maintain the flight vehicle 100 in a floated state.

The flight vehicle 100 may fly and float in the air by flotage. Particularly, the flight vehicle 100 may fly and move from one point to another point and may be moored at the other point while being floated in the air. For example, the flight vehicle 100 may be an airship or a non-powered flight vehicle including an auxiliary power device. However, the present disclosure is not limited thereto, and the flight vehicle 100 may be any type of flight vehicle that may float in the air in both flying and mooring states. Hereinafter, for convenience of description, the case where the flight vehicle 100 is an airship will be mainly described in detail.

The flight vehicle 100 may include an envelope 110 and a gondola 120. The envelope 110 may be filled with gas, and by the flotage provided by the envelope 110, the flight vehicle 100 may be floated in the air for a long time to perform various missions such as surveillance, observation, and communication relay. The envelope 110 may be filled with various types of gas lighter than air, such as helium, hydrogen, or the like. Also, the flight vehicle 100 may further include an air envelope (not illustrated) for adjusting the pressurization of the envelope 110 or adjusting the longitudinal attitude of the flight vehicle 100.

A gondola 120 may be arranged under the envelope 110. A propelling unit 300 for supplying a propulsion force T to fly the flight vehicle 100 may be installed in the gondola 120. However, the present disclosure is not limited thereto, and the propelling unit 300 may be installed in another portion of the flight vehicle 100, such as the envelope 110 or a wing (not illustrated).

The propelling unit 300 may include at least one propeller 310. Accordingly, the propelling unit 300 may generate a propulsion force T for propelling the flight vehicle 100 from the rotational force of the propeller 310. However, a propulsion force generating source of the propelling unit 300 is not limited to the propeller 310. For example, the propulsion force may be generated from the reaction force of the gas ejected from the flight vehicle 100. Hereinafter, the case where the propulsion force T is generated by using the propeller 310 that may be more easily controlled in speed and direction will be mainly described in detail. This may also apply to the following embodiments and modifications thereof. Also, for convenience of description, the case where the propelling unit 300 includes one propeller 310 will be mainly described.

In an embodiment, a propeller motor 320 and a tilting unit 330 may be coupled to a rotation shaft S of the propeller 310. The propeller motor 320 may rotate the propeller 310 to generate the propulsion force T, and the tilting unit 330 may change an angle θ formed between the gravity direction (the −X direction) and the rotation shaft S of the propeller 310. That is, the tilting unit 330 may tilt the rotation shaft S of the propeller 310 such that the rotation shaft S of the propeller 310 may rotate on the XZ plane. In this case, the angle θ formed between the rotation shaft S and the gravity direction (the −Z direction) may be smaller than 90 degrees. Accordingly, as the propeller 310 rotates, the propelling unit 300 may generate a propulsion force T having a vertical component force Tv acting in the gravity direction (the −Z direction).

Although not illustrated in FIG. 12, the tilting unit 330 may include a tilt shaft (not illustrated) connected to the rotation shaft S of the propeller 310, a tilt motor (not illustrated) for tilting the tilt shaft, or the like. However, the present disclosure is not limited thereto. For example, in an embodiment, the tilting unit 330 may be hinged to the rotation shaft S of the propeller 310.

The propelling unit 300 may include a propulsion controller 340. The propulsion controller 340 may control the direction of the propulsion force T to control the flight of the flight vehicle 100 in a desired direction. Particularly, the propulsion controller 340 may be connected to the tilting unit 330 to control the sizes of a vertical component force Tv and a horizontal component force Th of the propulsion force T to control the direction of the propulsion force T. Herein, the horizontal component force Th may mean a component force acting in the direction (the +X direction) perpendicular to the gravity direction (the −Z direction) in the propulsion force T.

Particularly, as illustrated in FIG. 13, when the angle θ formed between the gravity direction (the −Z direction) and the rotation shaft S of the propeller 310 decreases, the vertical component force Tv of the propulsion force T may increase. For example, among two propulsion forces T and T' of the same size, a propulsion force having a relatively greater angle θ with respect to the gravity direction (the −Z direction) will be referred to as a first propulsion force T, and a propulsion force having a relatively smaller angle θ with respect to the gravity direction (the −Z direction) will be referred to as a second propulsion force T'. In this case, a vertical component force Tv' of the second propulsion force T' may be greater than a vertical component force Tv of the first propulsion force T, while a horizontal component force Th' of the second propulsion force T' may be smaller than a horizontal component force Th of the first propulsion force T. Thus, by controlling the sizes of the vertical component force Tv or the horizontal component force Th, the angle θ formed between the gravity direction (the −Z direction) and the rotation shaft S of the propeller 310 may be adjusted. Accordingly, the direction of the propulsion force T may be controlled to fly the flight vehicle 100 in a desired direction. Particularly, since the vertical component force Tv of the propulsion force T is generated, the flight vehicle 100 may move toward the mooring unit 200 located under the flight vehicle 100.

Meanwhile, the propulsion controller 340 may control the driving of the tilt motor included in the tilting unit 330 in order to adjust the angle θ formed between the gravity direction (the −Z direction) and the rotation shaft S of the propeller 310. Also, the propulsion controller 340 may be designed to control not only the tilt operation of the tilting unit 330 but also the rotation speed of the propeller motor 320.

In addition to tilting the rotation shaft S of the propeller 310 as described above, there may be various methods of controlling the sizes of the vertical component force Tv and/or the horizontal component force Th. Other embodiments thereof will be described below with reference to FIG. 14.

In addition to the propelling unit 300 described above, the gondola 120 may include a winding unit 140 around which the cable C1 is wound. The winding unit 140 may be arranged in the gondola 120. In this case, the gondola 120 may include a closable opening (not illustrated) such that the cable C1 unwound from the winding unit 140 may fall to be connected to the mooring unit. However, the present disclosure is not limited thereto, and the winding unit 140 may be arranged on an outer surface of the gondola 120.

Figure 14:
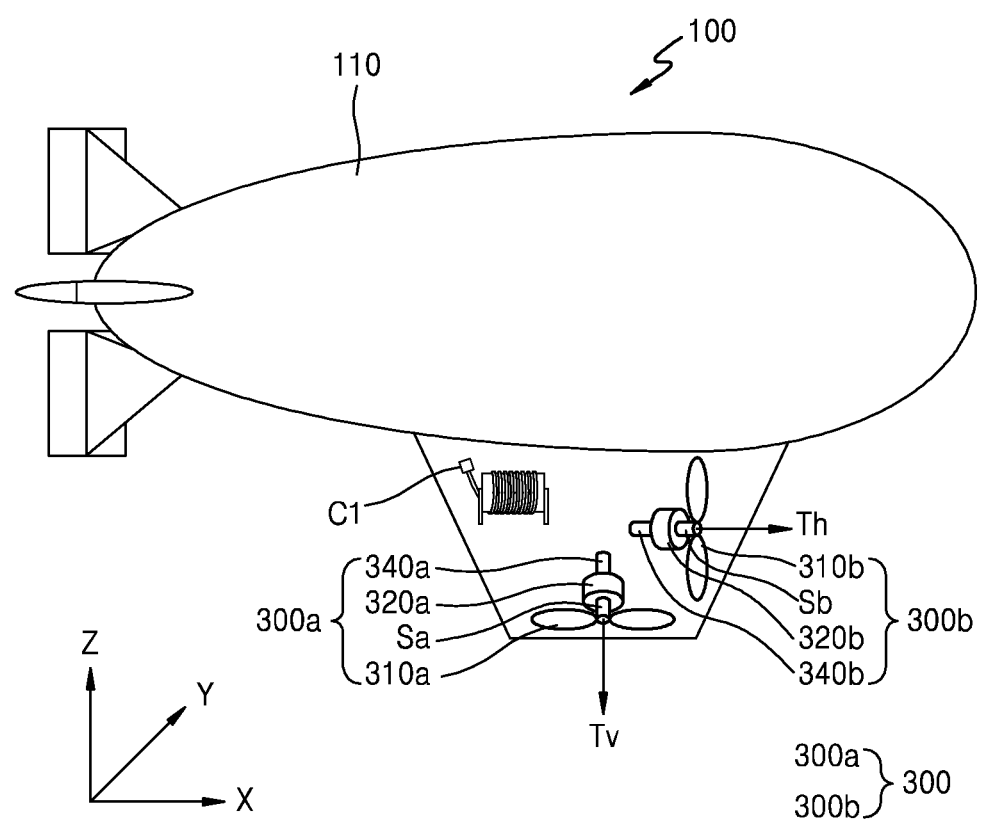
FIG. 14 is a conceptual diagram schematically illustrating a flight vehicle included in a flight vehicle operating system according to another embodiment of the present disclosure.

FIG. 14 is a conceptual diagram schematically illustrating a flight vehicle constituting a flight vehicle operating system according to another embodiment of the present disclosure. In this case, the embodiment illustrated in FIG. 14 has substantially the same configuration as the previous embodiments described with reference to FIG. 12 and the like, except for the propelling unit 300. Hereinafter, for convenience of description, the embodiments illustrated in FIG. 14 will be described in detail, focusing on differences from the above embodiments.

Referring to FIG. 14, a flight vehicle operating system according to another embodiment of the present disclosure may include a flight vehicle 100, a mooring unit (not illustrated), a cable C1, and a propelling unit 300.

The flight vehicle 100 may fly and float in the air in a mooring state. The flight vehicle 100 may include the propelling unit 300 installed to supply a propulsion force T for flight. Although FIG. 14 and the like illustrate that the propelling unit 300 is installed in the gondola 120 under the envelope 110, the present disclosure it is not limited thereto and the propelling unit 300 may be installed at various positions of the flight vehicle 100.

In an embodiment, the propelling unit 300 may include a first propelling unit 300a and a second propelling unit 300b. In this case, the first propelling unit 300a may generate a vertical component force Tv acting in the gravity direction (the −Z direction) in the propulsion force T, and the second propelling unit 300b may generate a horizontal component force Th acting in a direction perpendicular to the vertical component force Tv in the propulsion force T. That is, a resultant force of the vertical component force Tv generated by the first propelling unit 300a and the horizontal component force Th generated by the second propelling unit 300b may be a total propulsion force propelling the flight vehicle 100.

In this case, the first propelling unit 300a may include at least one first propeller 310a to generate the vertical component force Tv, and the second propelling unit 300b may include at least one second propeller 310b to generate the horizontal component force Th. Hereinafter, for convenience of description, the case where the first propelling unit 300a and the second propelling unit 300b respectively include one first propeller 310a and one second propeller 310b will be mainly described.

A first propeller motor 320a may be coupled to a rotation shaft Sa of the first propeller 310a included in the first propelling unit 300a. The first propeller motor 320a may rotate the first propeller 310a to generate the vertical component force Tv of the propulsion force T. Also, a second propeller motor 320b may be coupled to a rotation shaft Sb of the second propeller 310b included in the second propelling unit 300b, and the second propeller motor 320b may rotate the second propeller 310b to generate the horizontal component force Th of the propulsion force T.

The first propelling unit 300a and the second propelling unit 300b may include a propulsion controller. The propulsion controller may control the direction of the propulsion force T to control the flight of the flight vehicle 100 in a desired direction. In an embodiment, the propelling unit may include a first propulsion controller 340a and a second propulsion controller 340b.

The first propulsion controller 340a may adjust the size of the vertical component force Tv of the propulsion force T by controlling the rotation of the first propeller 310a included in the first propelling unit 300a. Particularly, the first propulsion controller 340a may be connected to the first propeller motor 320a to control the rotation speed of the first propeller 310a to adjust the size of the vertical component force Tv of the propulsion force T. Similarly, the second propulsion controller 340b may adjust the size of the horizontal component force Th of the propulsion force T by controlling the rotation of the second propeller 310b included in the second propelling unit 300b. Particularly, the second propulsion controller 340b may be connected to the second propeller motor 320b to control the rotation speed of the second propeller 310b.

As described above, the size of the vertical component force Tv of the propulsion force T generated by the first propelling unit 300a may be controlled by the first propulsion controller 340a and the size of the horizontal component force Th of the propulsion force T generated by the second propelling unit 300b may be controlled by the second propulsion controller 340b to determine the direction of the propulsion force T for propelling the flight vehicle 100. Accordingly, the flight vehicle 100 may fly in a desired direction. Particularly, as the vertical component force Tv of the propulsion force T is generated, the flight vehicle 100 may move toward the mooring unit located under the flight vehicle 100.

Hereinafter, a process of mooring and floating the flight vehicle 100 according to the above embodiments described with reference to FIGS. 15 to 19 will be described in more detail.

FIGS. 15 to 19 are conceptual diagrams sequentially illustrating a flight vehicle operating method using the flight vehicle operating system of FIG. 12.

Figure 15:
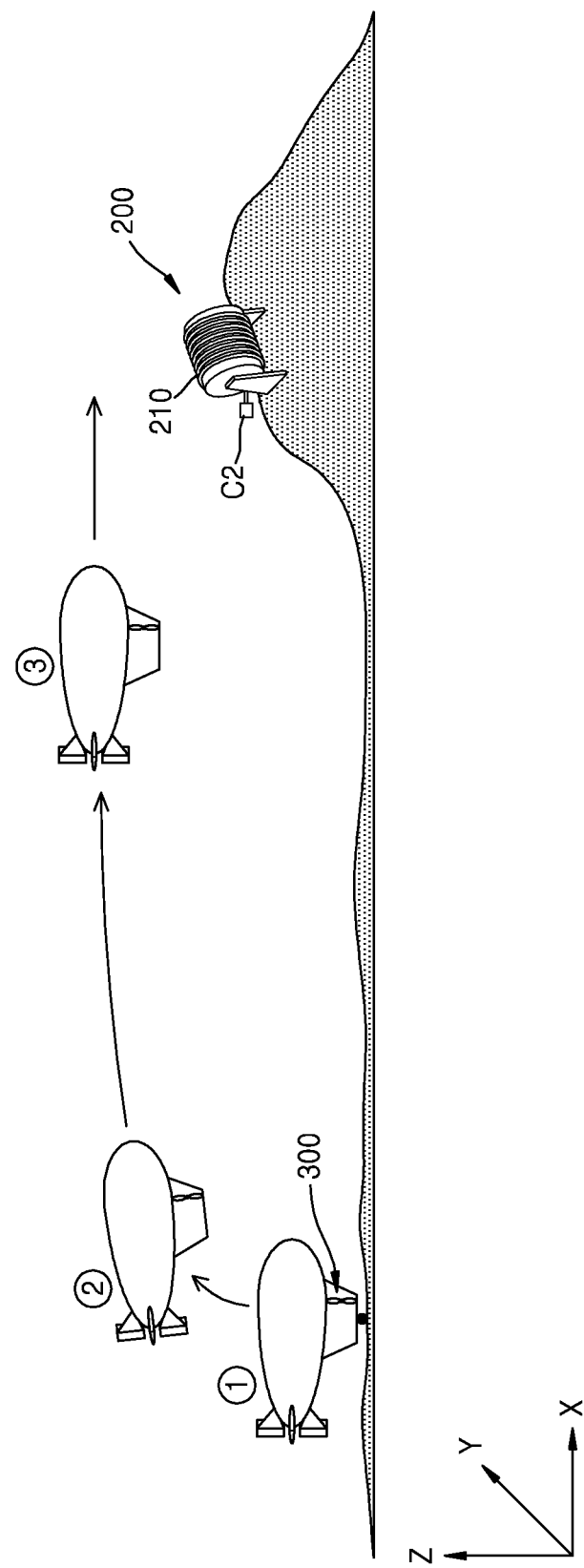
FIGS. 15 to 19 are conceptual diagrams sequentially illustrating a flight vehicle operating method using the flight vehicle operating system of FIG. 12.

As illustrated in ①of FIG. 15, the flight vehicle 100 may land or moor at a particular point and then take off to move to a point where the flight vehicle 100 is required to perform a mission. In this case, the flight vehicle 100 may rise from a takeoff point by the flotage of the gas stored in the envelope 110 or by a combination of the flotage of gas and the propulsion force of a propelling device. The takeoff point may be a future landing point. Also, the landing point may be a point located on the ground, or may be a point located on one surface of a ship or float. Thereafter, the flight vehicle 100 may rise to a certain height as illustrated in ② of FIG. 15. Thereafter, as illustrated in ③ of FIG. 15, the flight vehicle 100 may move toward a mission point by the propulsion force generated from the propelling unit 300 including the propeller.

Figure 16:
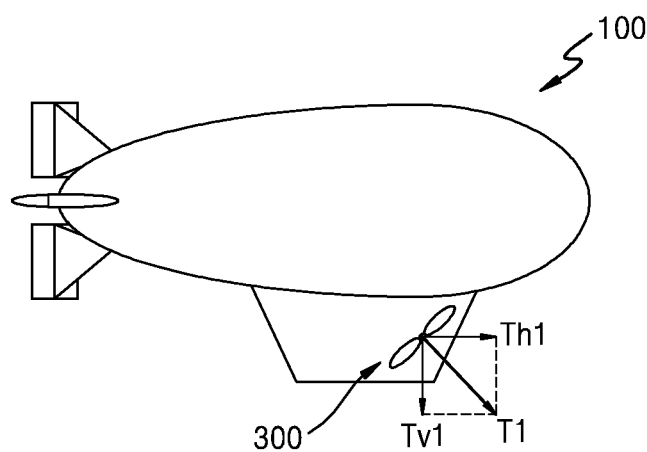
Figure 16:
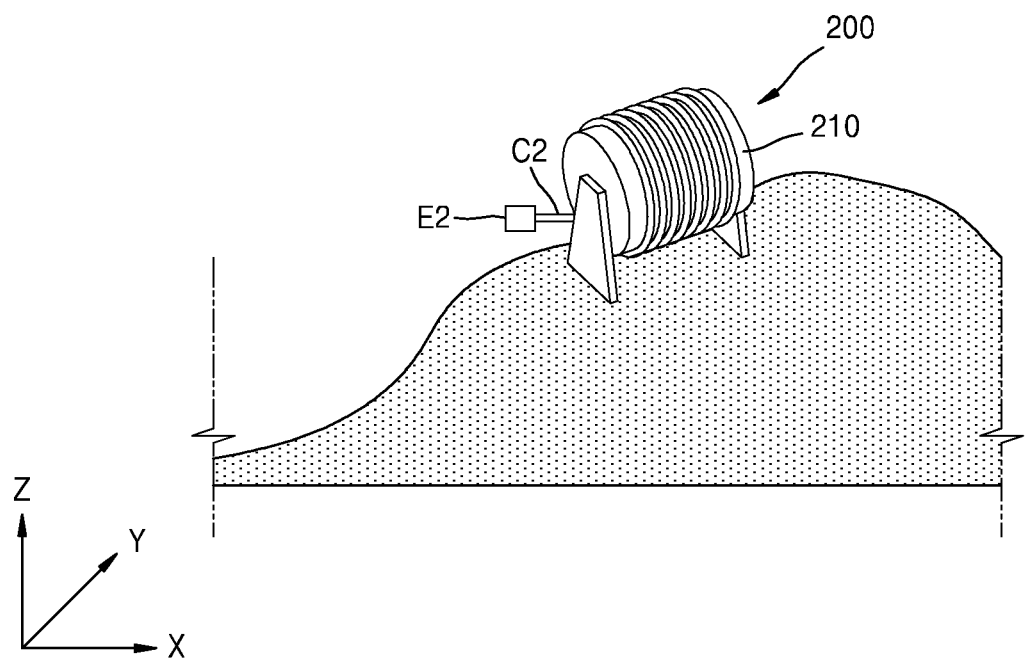

Thereafter, as illustrated in FIG. 16, the flight vehicle 100 may reach a point where the mooring unit 200 is located (i.e., the mission point). In this case, the mooring unit 200 may include a mooring winding unit 210 around which a mooring cable C2 is wound, like the winding unit 140 included in the flight vehicle 100.

In this operation, the flight vehicle 100 may move obliquely with respect to the Z axis in order to fall in the −Z direction while advancing in the +X direction by the propulsion force T1 generated from the propelling unit 300. In this case, a vertical component force Tv1 of the first propulsion force T1 may be set to be greater than a horizontal component force Th1 of the first propulsion force T1 such that the flight vehicle 100 may rapidly move toward the mooring unit 200. Accordingly, the flight vehicle 100 may rapidly fall to a certain height or the ground to be connected to the mooring unit 200 by the cable C1.

The size and direction of the first propulsion force T1 may be suitably controlled according to circumstances. The first propulsion force T1 may be controlled by adjusting the angle θ formed between the gravity direction (the −Z direction) and the rotation shaft of the propeller included in the propelling unit 300 as illustrated in FIGS. 12 and 13. However, the present disclosure is not limited thereto. For example, as illustrated in FIG. 14, the first propelling unit 300a and the second propelling unit 300b may independently adjust the vertical component force Tv1 and the horizontal component force Th1 to control the first propulsion force T1.

Figure 17:
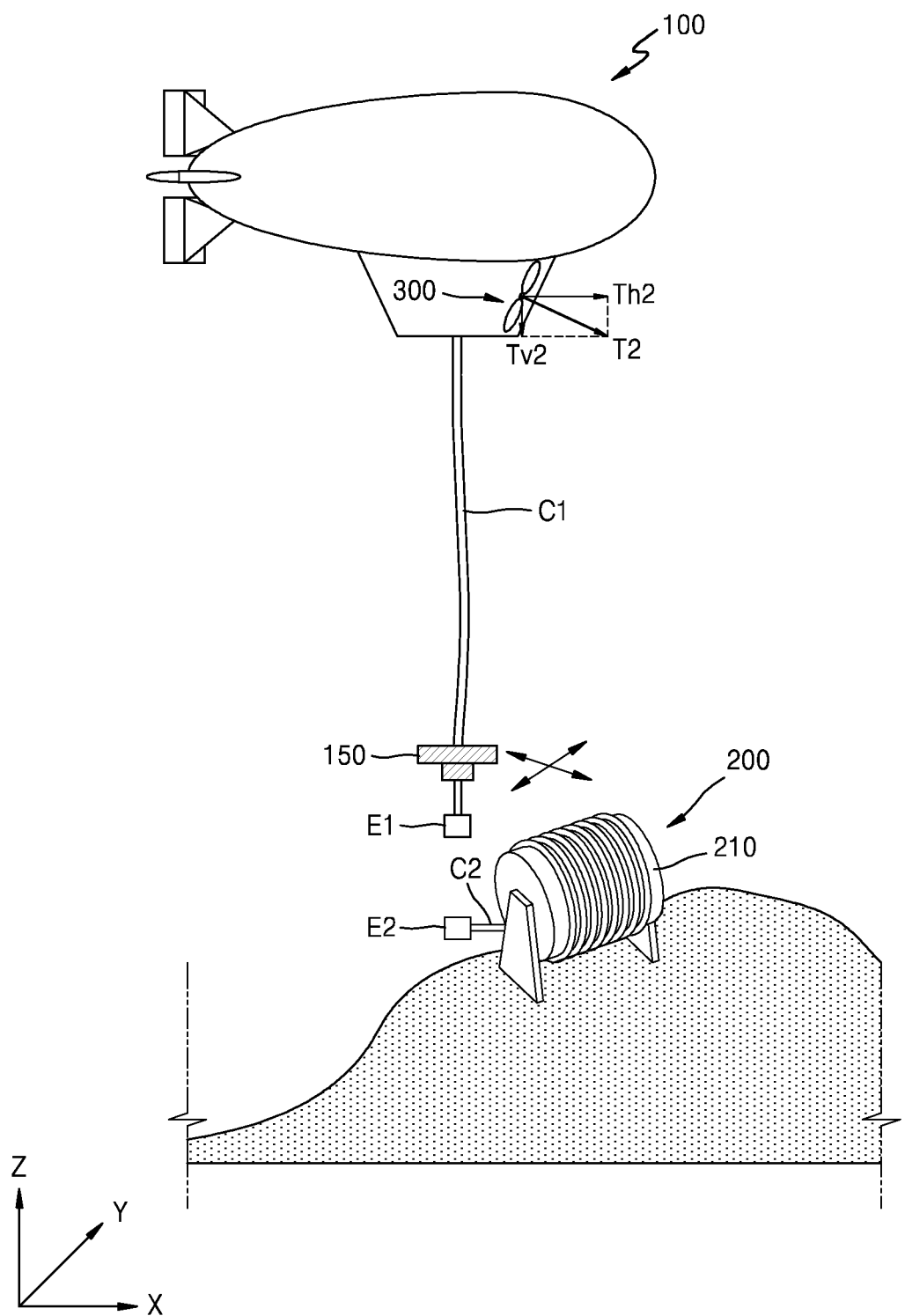

Thereafter, as illustrated in FIG. 17, the flight vehicle 100 may transfer the cable C1 toward the mooring unit 200. In this case, the cable C1 may be transferred by the winding unit 140 illustrated in FIG. 12.

A guide unit 150 may be installed at an end portion E1 of the cable C1, and the cable C1 may be guided by the guide unit 150 to the mooring unit 200, particularly to an end portion E2 of the mooring cable C2. In an embodiment, the guide unit 150 may include a motor (not illustrated) and a propeller (not illustrated) that are electrically driven. The motor and the propeller may be controlled by a wireless signal or an automatic position control device to guide the end portion E1 of the cable C1 to a desired position.

Particularly, the guide unit 150 may be located over the end portion E1 of the cable C1, and the guide unit 150 and the end portion E1 may be spaced apart from each other by a certain distance. Accordingly, the end portion E1 of the cable C1 may be easily thrown to the end portion E2 of the mooring cable C2. However, since the flight vehicle 100 may also rise due to the instantaneous rise of the guide unit 150, it may be necessary to suitably control the movement of the guide unit 150 so that the guide unit 150 may not rise excessively.

As such, by guiding the end portion E1 of the cable C1 to the end portion E2 of the mooring cable C2 by suitably controlling the movement of the guide unit 150, the end portion E1 of the cable C1 may be stably connected to the end portion E2 of the mooring cable C2. Accordingly, the flight vehicle 100 may be moored to the mooring unit 200 despite the vibration caused by draft, flotage, or the like. However, the present disclosure is not limited thereto, and the cable C1 may be directly wound around or connected to the mooring unit 200 without the mooring cable C2. Hereinafter, for convenience of description, the case where cable C1 and the mooring cable C2 are connected to each other will be mainly described in detail.

Although not illustrated in FIG. 17 and the like, the end portion E1 of the cable C1 may be formed in the shape of a hook, a ring, or the like to be connected to the end portion E2 of the mooring cable C2. Also, a power line and/or a signal line may be embedded in each of the cable C1 and the mooring cable C2 and thus the power line and/or the signal line of the cable C1 and the power line and/or the signal line of the mooring cable C2 may be fastened to each other in the form of a connector. Accordingly, a control signal may be transmitted to the flight vehicle 100 or data may be received from the flight vehicle 100 through the signal line, and power may be supplied to the flight vehicle 100 through the power line.

In this operation, like the first propulsion force T1 illustrated in FIG. 16, the second propulsion force T2 generated from the propelling unit 300 may act obliquely such that the flight vehicle 100 may fall in the −Z direction while advancing in the +X direction. However, since the movement amount of the flight vehicle 100 is small in comparison with the operation illustrated in FIG. 16, the size of the second propulsion force T2 may be smaller than the size of the first propulsion force T1 and the difference between the size of the vertical component force Tv2 of the second propulsion force T2 and the size of the horizontal component force Th2 of the second propulsion force T2 may not be great.

The second propulsion force T2 may not be limited as acting such that the flight vehicle 100 falls in the −Z direction while advancing in the +X direction. For example, according to the guidance of the guide unit 150, the second propulsion force T2 may act only in the +X direction or only in the −Z direction.

The size and direction of the second propulsion force T2 may be suitably controlled according to circumstances. The second propulsion force T2 may be controlled by adjusting the angle θ formed between the gravity direction (the −Z direction) and the rotation shaft of the propeller included in the propelling unit 300 as illustrated in FIGS. 12 and 13. However, the present disclosure is not limited thereto. For example, as illustrated in FIG. 14, the first propelling unit 300a and the second propelling unit 300b may independently adjust the vertical component force Tv2 and the horizontal component force Th2 to control the second propulsion force T2.

Although FIG. 17 illustrates that the flight vehicle 100 moors while rising by a certain height from the mooring unit 200, the present disclosure is not limited thereto. That is, the flight vehicle 100 may temporarily land on the ground of the land where the mooring unit 200 is located, or on one side of the ship or the float, and the cable C1 may be connected to the mooring cable C2 while the flight vehicle 100 is landing temporarily as such. In this case, the configuration of the guide unit 150 described above may be omitted.

Figure 18:
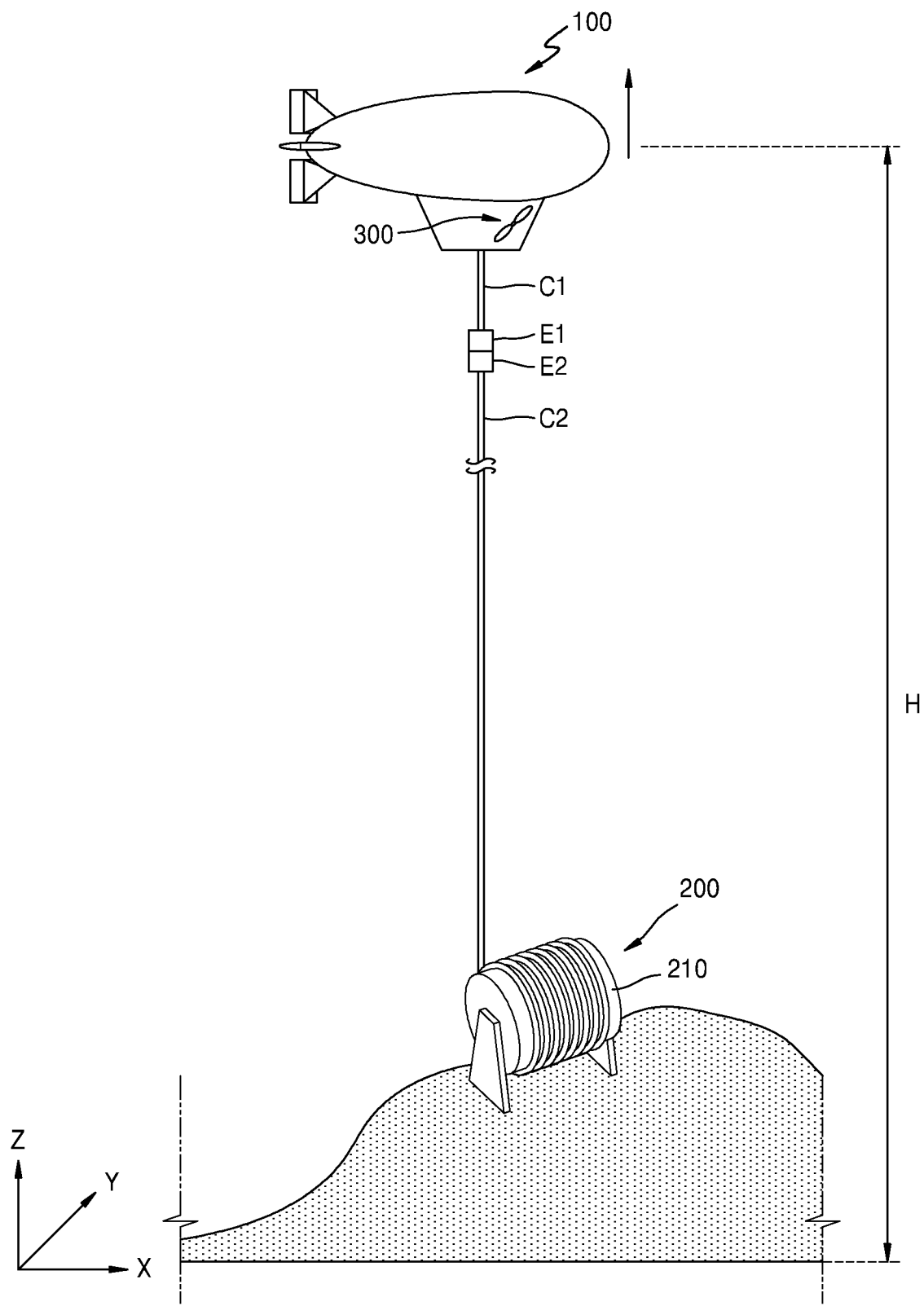

Thereafter, as illustrated in FIG. 18, the flight vehicle 100 may float at a suitable altitude H to perform a given mission. Herein, the suitable altitude H may be a height at which the flight vehicle 100 is suitable for performing a mission such as surveillance, observation, or communication relay, and may be an altitude below a pressure altitude that is a maximum altitude that may be implemented by the gas inside the envelope 110.

In this operation, the value of the propulsion force generated from the propelling unit 300 may be zero. That is, the flight vehicle 100 may not be propelled by the propulsion force but may float to the suitable altitude H by flotage. This is because the value of the propulsion force generated from the propelling unit 300 becomes zero and accordingly the vertical component force of the propulsion force in the gravity direction (the −Z direction) is removed and thus the force acting in the Z axis direction in the flight vehicle 100 mainly includes a flotage acting in the reverse direction (the +Z direction) of the gravity direction. Thus, the flight vehicle 100 may rise toward the suitable altitude H by the flotage.

The winding of the mooring cable C2 in the mooring unit 200 may be released in the process of the flight vehicle 100 floating by the flotage as described above. Accordingly, the flight vehicle 100 connected to the mooring cable C2 may rise to the suitable altitude H. When the flight vehicle 100 reaches the suitable altitude H, the release of the winding of the mooring cable C2 may be stopped and thus the flight vehicle 100 may fly for a long period. When the flight vehicle 100 floats, the winding of the cable C1 connected to the mooring cable C2 may be released instead of the winding of the mooring cable C2 or the windings of the cable C1 and the mooring cable C2 may be released together.

Figure 19:
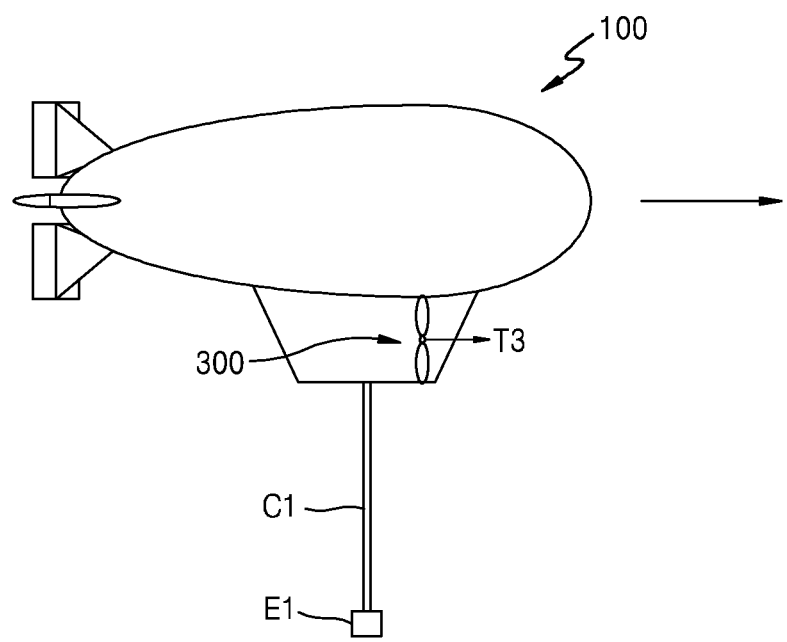
Figure 19:
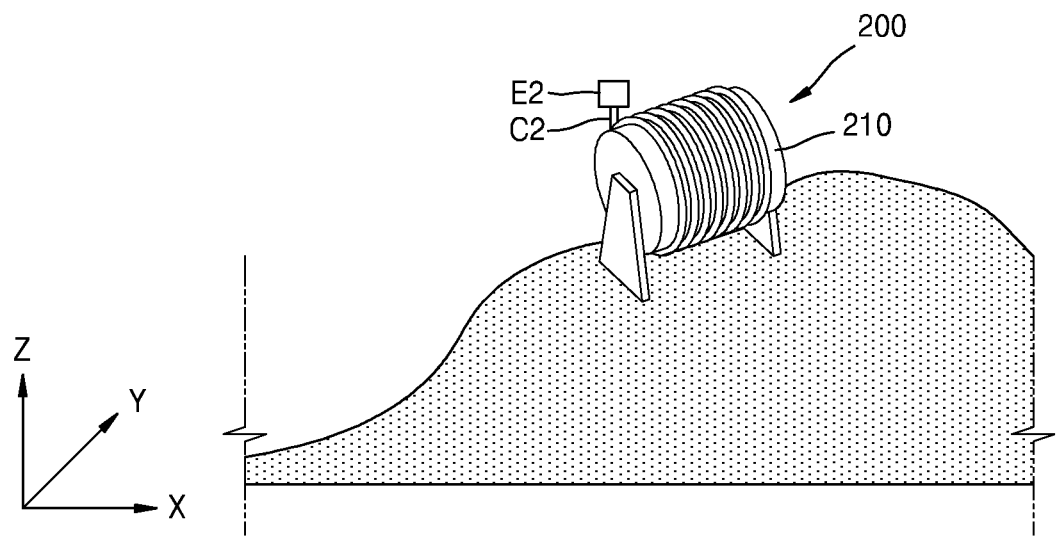

Thereafter, as illustrated in FIG. 19, the connection between the flight vehicle 100 and the mooring unit 200 may be released. Particularly, the connection between the end portion E1 of the cable C1 and the end portion E2 of the mooring cable C2 may be released, the cable C1 may be withdrawn to the flight vehicle 100, and the mooring cable C2 may be withdrawn to the mooring unit 200. Accordingly, the flight vehicle 100 may be the same as or similar to the state illustrated in ③ of FIG. 15 and may fly to the original takeoff point or to another mission point. In this case, the propelling unit of the flight vehicle 100 may generate a third propulsion force T3, and the third propulsion force T3 may act in a direction (e.g., the +X direction) toward a new target point.

As described above, according to various embodiments of the present disclosure, a flight vehicle capable of functioning as an aerostat and an airship may be easily operated. Also, since a flight vehicle capable of long-term flight at high altitudes may be deployed in a timely manner, a mission accomplishment may be improved.

Although the present disclosure has been described with reference to the embodiments illustrated in the drawings, this is merely an example and those of ordinary skill in the art will understand that various modifications may be made therein. Thus, the spirit and scope of the present disclosure should be defined by the appended claims.

INDUSTRIAL APPLICABILITY

The present disclosure provides flight vehicle operating methods and flight vehicle operating systems using the same, which are for operating flight vehicles capable of functioning as aerostats and airships. Accordingly, since a flight vehicle capable of long-term flight at high altitudes may be deployed in a timely manner, missions such as surveillance, observation, and communication relay may be effectively performed.

The invention claimed is:

1. A flight vehicle operating method for mooring the flight vehicle and adjusting flotation of the flight vehicle, the method comprising:
 an operation (a) of flying a flight vehicle toward a mooring unit located below the flight vehicle;
 an operation (b) of mooring the flight vehicle to the mooring unit by connecting the flight vehicle and the mooring unit to each other by a cable;
 an operation (c) of reducing a weight of the flight vehicle, increasing the flotage of the flight vehicle, or increasing the flotage of the flight vehicle while reducing the weight of the flight vehicle, by using a first flotation adjuster;
 an operation (d) of floating the flight vehicle at a suitable altitude in the air;
 an operation (e) of increasing the weight of the flight vehicle, reducing the flotage of the flight vehicle, or reducing the flotage of the flight vehicle while increasing the weight of the flight vehicle, by using a second flotation adjuster or a propelling unit of the flight vehicle; and
 an operation (f) of releasing the connection between the flight vehicle and the mooring unit and withdrawing the cable, wherein the mooring of the flight vehicle to the mooring unit comprises guiding the cable to the mooring unit by using a guide unit installed at an end portion of the cable, wherein the guide unit comprises a motor and a propeller, the motor and the propeller being controlled by a wireless signal or an automatic position control device to guide the end portion of the cable to the mooring unit, wherein the guide unit is integrated to the first flotation adjuster and the second flotation adjuster, and comprises a winding unit which winds or unwinds the cable, and wherein the guide unit rises or falls to change the weight of the flight vehicle and to guide the cable to the mooring unit while unwinding the cable or retract the cable from the mooring unit while winding the cable.

2. The flight vehicle operating method of claim 1, wherein the operation (c) comprises an operation of reducing the weight of the flight vehicle by lowering the first flotation adjuster or by unloading the first flotation adjuster from the flight vehicle by discharging the first flotation adjuster to an outside, and the operation (e) comprises an operation of increasing the weight of the flight vehicle by loading the second flotation adjuster into the flight vehicle by raising the second flotation adjuster, or reducing the flotage of the flight vehicle by unloading the second flotation adjuster from the flight vehicle by discharging the second flotation adjuster to the outside.

3. The flight vehicle operating method of claim 1, further comprising raising or lowering the flight vehicle by winding or unwinding the cable by rotating a mooring winding unit installed in the mooring unit.

* * * * *